(12) United States Patent
Fang

(10) Patent No.: US 11,032,368 B2
(45) Date of Patent: Jun. 8, 2021

(54) DATA PROCESSING METHOD, APPARATUS, AND SYSTEM

(71) Applicant: HUAWEI TECHNOLOGIES CO., LTD., Guangdong (CN)

(72) Inventor: Xin Fang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 807 days.

(21) Appl. No.: 15/634,819

(22) Filed: Jun. 27, 2017

(65) Prior Publication Data
US 2017/0293533 A1 Oct. 12, 2017

Related U.S. Application Data

(63) Continuation of application No. PCT/CN2014/095223, filed on Dec. 27, 2014.

(51) Int. Cl.
*H04L 29/08* (2006.01)
*G06F 16/11* (2019.01)
(Continued)

(52) U.S. Cl.
CPC .......... *H04L 67/1097* (2013.01); *G06F 3/067* (2013.01); *G06F 3/0619* (2013.01);
(Continued)

(58) Field of Classification Search
CPC ... H04L 67/1097; H04L 67/42; G06F 16/122; G06F 16/16; G06F 16/00; G06F 3/0619;
(Continued)

(56) References Cited

U.S. PATENT DOCUMENTS

| 7,373,366 B1 | 5/2008 | Chatterjee et al. |
| 7,937,528 B2 | 5/2011 | Cousins |

(Continued)

FOREIGN PATENT DOCUMENTS

| CN | 101515296 A | 8/2009 |
| CN | 101783814 A | 7/2010 |

(Continued)

OTHER PUBLICATIONS

Shriram Pore et al: "Object Striping in Swift", Nov. 7, 2013, XP055424056, Openstack Summit 2013, Hong Kong, 66 pages.
(Continued)

*Primary Examiner* — Apu M Mofiz
*Assistant Examiner* — Husam Turki Samara
(74) *Attorney, Agent, or Firm* — Leydig, Voit & Mayer, Ltd.

(57) ABSTRACT

Embodiments of the present invention provide a data management technology. An OSD receives a strip write request sent by a client server, where the strip write request carries a to-be-written strip, a version number of the to-be-written strip, an offset of the to-be-written strip, and an object ID of the to-be-written strip; and the OSD writes the to-be-written strip into a storage location determined by using the object ID, the version number of the to-be-written strip, and the offset of the to-be-written strip. By applying the present invention, a quantity of object IDs can be reduced.

16 Claims, 5 Drawing Sheets

(51) Int. Cl.
  *G06F 16/16*   (2019.01)
  *G06F 16/00*   (2019.01)
  *G06F 3/06*    (2006.01)
  *G06F 11/14*   (2006.01)
  *H04L 29/06*   (2006.01)

(52) U.S. Cl.
  CPC ........ *G06F 3/0647* (2013.01); *G06F 11/1461* (2013.01); *G06F 11/1464* (2013.01); *G06F 16/00* (2019.01); *G06F 16/122* (2019.01); *G06F 16/16* (2019.01); *H04L 67/42* (2013.01); *G06F 2201/84* (2013.01)

(58) Field of Classification Search
  CPC ...... G06F 3/0647; G06F 3/0659; G06F 3/067; G06F 11/1461; G06F 11/1464; G06F 2201/84
  See application file for complete search history.

(56) References Cited

U.S. PATENT DOCUMENTS

| | | | |
|---|---|---|---|
| 8,099,572 B1 * | 1/2012 | Arora | G06F 13/28 711/162 |
| 8,285,758 B1 | 10/2012 | Bono et al. | |
| 8,352,501 B2 | 1/2013 | Baptist et al. | |
| 8,825,602 B1 | 9/2014 | Desai et al. | |
| 9,400,741 B1 * | 7/2016 | Bono | G06F 3/0611 |
| 9,817,834 B1 | 11/2017 | Searls et al. | |
| 9,824,095 B1 | 11/2017 | Taylor et al. | |
| 2002/0169932 A1 | 11/2002 | Burns et al. | |
| 2004/0030951 A1 | 2/2004 | Armangau | |
| 2006/0174157 A1 | 8/2006 | Barrall et al. | |
| 2006/0204134 A1 | 9/2006 | Modrall et al. | |
| 2007/0043790 A1 | 2/2007 | Kryger | |
| 2007/0255768 A1 | 11/2007 | Shitomi et al. | |
| 2010/0332401 A1 | 12/2010 | Prahlad et al. | |
| 2011/0184912 A1 | 7/2011 | Baptist et al. | |
| 2012/0124105 A1 | 5/2012 | Provenzano | |
| 2012/0324185 A1 | 12/2012 | Nonaka | |
| 2013/0066930 A1 | 3/2013 | Kamei et al. | |
| 2013/0339407 A1 | 12/2013 | Sharpe et al. | |
| 2014/0006357 A1 | 1/2014 | Davis et al. | |
| 2014/0146055 A1 | 5/2014 | Bala et al. | |
| 2014/0149492 A1 | 5/2014 | Ananthanarayanan et al. | |
| 2014/0344539 A1 | 11/2014 | Gordon et al. | |
| 2015/0244795 A1 | 8/2015 | Cantwell et al. | |
| 2016/0246516 A1 | 8/2016 | Zhang | |
| 2017/0230459 A1 | 8/2017 | Lin et al. | |

FOREIGN PATENT DOCUMENTS

| | | |
|---|---|---|
| CN | 103558998 A | 2/2014 |
| CN | 104079600 A | 10/2014 |
| JP | 2006146904 A | 6/2006 |
| JP | 2008519350 A | 6/2008 |
| JP | 2012505461 A | 3/2012 |
| NO | 2014188418 A1 | 11/2014 |

OTHER PUBLICATIONS

Wang Yong-Kui et al.,"Research of Object-based Storage System," Computer Engineering, vol. 33 No. 24, pp. 266-270 (Dec. 2007). With English abstract.

* cited by examiner

| Object 0 | Object 1 | Object 2 | ... |
|---|---|---|---|
| Strip 0 | Strip 4 | Strip 8 | ... |
| Strip 1 | Strip 5 | Strip 9 | ... |
| Strip 2 | Strip 6 | Strip 10 | ... |
| Strip 3 | Strip 7 | Strip 11 | ... |

FIG. 3A

| Object 0 | Object 1 | Object 2 |
|---|---|---|
| Strip 0 | Strip 1 | Strip 2 |
| Strip 3 | Strip 4 | Strip 5 |
| Strip 6 | Strip 7 | Strip 8 |
| Strip 9 | Strip 10 | Strip 11 |
| ... | ... | ... |

FIG. 3B

DATA PROCESSING METHOD, APPARATUS, AND SYSTEM

CROSS-REFERENCE TO RELATED APPLICATION

This application is a continuation of International Application No. PCT/CN2014/095223, filed on Dec. 27, 2014, the disclosure of which is hereby incorporated by reference in its entirety.

TECHNICAL FIELD

The present invention relates to the storage field, and in particular, to a data processing method, apparatus, and system.

BACKGROUND

An object-based storage system (Object-based Storage System) is a distributed storage system and includes a storage server and an object-based storage device (OSD). The object-based storage system may also be referred to as an object storage system, and the object-based storage device may also be referred to as an object storage device. In the object storage system, an object is used as a most basic content storage unit. Data may be a file or a volume. A file is used as an example, where the file is split into fragments, a file fragment has attribute information, the file fragment, metadata of the file fragment, and an attribute of the file fragment may jointly constitute an object, and the object is stored in multiple OSDs.

The object storage system provides a snapshot function. A snapshot is a copy of a specified data set, and the copy marks an image of corresponding data at a time point (a start time point of the copy).

A file is used as an example. After a snapshot is taken, if an entire file or a part of data of the file is modified, modified data needs to be stored in the storage system. In the prior art, an object ID is used as a unique identifier of an object, and if a same file is updated, updated data needs to be stored in the storage device as a new object ID. If the file is frequently updated, a total quantity of object IDs becomes very large, which occupies relatively large storage space and increases a system resource loss.

SUMMARY

The present invention provides a data management technology, which can reduce a total quantity of object IDs and reduce storage space occupied by the object IDs.

According to a first aspect, an embodiment of the present invention provides a data storage method, including: receiving, by an object storage device OSD, a strip write request sent by a client server, where the strip write request carries a to-be-written strip, a version number of the to-be-written strip, an offset of the to-be-written strip, and an object ID of the to-be-written strip, the version number of the to-be-written strip is corresponding to a snapshot ID of a latest snapshot of a file or a volume to which the to-be-written strip belongs, the offset of the to-be-written strip describes a location of the to-be-written strip in an object to which the to-be-written strip belongs, and the object ID of the to-be-written strip is an ID of the object to which the to-be-written strip belongs; and writing, by the OSD, the to-be-written strip into a storage location determined by using the object ID, the version number of the to-be-written strip, and the offset of the to-be-written strip.

According to a second aspect, an embodiment of the present invention provides a data storage method, including: receiving, by an object storage device OSD, a strip write request sent by a client server, where the strip write request carries a to-be-written strip, a version number of the to-be-written strip, an offset of the to-be-written strip, and an object ID of the to-be-written strip, the version number of the to-be-written strip is corresponding to a snapshot ID of a latest snapshot of a file or a volume to which the to-be-written strip belongs, the offset of the to-be-written strip describes a location of the to-be-written strip in an object to which the to-be-written strip belongs, and the object ID of the to-be-written strip is an ID of the object to which the to-be-written strip belongs; determining, by the OSD, whether an object determined by using the version number of the to-be-written strip and the object ID is backed up; and if the object is backed up, writing, by the OSD, the to-be-written strip into a storage location determined by using the object ID, the version number of the to-be-written strip, and the offset of the to-be-written strip; or if the object is not backed up, creating, by the OSD, a spliced object by using the to-be-written strip, and then writing the spliced object into a storage location determined by using the version number of the to-be-written strip and the object ID.

According to a third aspect, an embodiment of the present invention provides a data storage method, including: receiving, by an object storage device OSD, a strip write request sent by a client server, where the strip write request carries a to-be-written strip, a version number of the to-be-written strip, an offset of the to-be-written strip, and an object ID of the to-be-written strip, the version number of the to-be-written strip is corresponding to a snapshot ID of a latest snapshot of a file or a volume to which the to-be-written strip belongs, the offset of the to-be-written strip describes a location of the to-be-written strip in an object to which the to-be-written strip belongs, and the object ID of the to-be-written strip is an ID of the object to which the to-be-written strip belongs; determining, by the OSD, whether a strip determined by using the version number of the to-be-written strip, the object ID of the to-be-written strip, and the offset of the to-be-written strip is backed up; and if the strip is backed up, writing the to-be-written strip into a storage location determined by using the version number of the to-be-written strip, the object ID of the to-be-written strip, and the offset of the to-be-written strip; or if the strip is not backed up, backing up data that is in an object of a base version in the OSD and whose offset is the offset of the to-be-written strip and size is a size of the to-be-written strip to the storage location determined by using the version number of the to-be-written strip, the offset of the to-be-written strip, and the object ID of the to-be-written strip, where an object ID of the object of the base version is the same as the object ID of the to-be-written strip, and a version number of the object of the base version is a base version number, and writing the to-be-written strip into a storage location determined by using the object ID of the to-be-written strip, the base version number, and the offset of the to-be-written strip.

According to a fourth aspect, an embodiment of the present invention provides a data storage method, including: receiving, by an object storage device OSD, a strip write request sent by a client server, where the strip write request carries a to-be-written strip, a version number of the to-be-written strip, an offset of the to-be-written strip, and an object ID of the to-be-written strip, the version number of the to-be-written strip is corresponding to a snapshot ID of a latest snapshot of a file or a volume to which the to-be-written strip belongs, the offset of the to-be-written strip describes a location of the to-be-written strip in an object to which the to-be-written strip belongs, and the object ID of the to-be-written strip is an ID of the object to which the to-be-written strip belongs; determining, by the OSD, whether an object determined by using the version number of the to-be-written strip and the object ID is backed up; and if the object is backed up, writing, by the OSD, the to-be-written strip into a storage location determined by using the object ID, a version number of the object, and the offset of the to-be-written strip; or if the object is not backed up, backing up data in an object of a base version in the OSD to a storage location determined by using the version number of the to-be-written strip and the object ID, where an object ID of the object of the base version is the same as the object ID of the to-be-written strip, and a version number of the object of the base version is a base version number, and writing, by the OSD, the to-be-written strip into a storage location determined by using the object ID, the base version number, and the offset of the to-be-written strip.

According to a fifth aspect, an embodiment of the present invention provides a data reading method, including: receiving, by an object storage device OSD, a strip read request sent by a client server, where the strip read request carries a size of a to-be-read strip, an offset of the to-be-read strip, a version number of the to-be-read strip, and an object ID of the to-be-read strip, the version number of the to-be-read strip is corresponding to a snapshot ID of a latest snapshot of a file or a volume to which the to-be-read strip belongs, and the object ID of the to-be-read strip is an ID of an object to which the to-be-read strip belongs; determining, by the OSD, whether a strip determined by using the object ID, the version number of the to-be-read strip, and the offset of the to-be-read strip is backed up; and if the strip is backed up, reading data determined by using the object ID, the version number of the to-be-read strip, the offset of the to-be-read strip, and the size of the to-be-read strip, using the read data as the to-be-read strip, and sending the to-be-read strip to the client server; or if the strip is not backed up, searching, one by one according to a descending order of snapshot times of objects, the objects whose object IDs are the same as the object ID of the to-be-read strip and version numbers are different from the version number of the to-be-read strip until an object that stores valid data in a storage location determined by using the offset of the to-be-read strip is found, using the found valid data as the to-be-read strip, and sending the to-be-read strip to the client server, where a version number of the object is corresponding to the snapshot ID that is of the latest snapshot of the file or the volume to which the to-be-read strip belongs and that exists before the object is generated.

According to a sixth aspect, an embodiment of the present invention provides a data reading method, including: receiving, by the OSD, a strip read request sent by the client server, where the strip read request carries a size of a to-be-read strip, an offset of the to-be-read strip, a version number of the to-be-read strip, and an object ID of the to-be-read strip, the version number of the to-be-read strip is corresponding to a snapshot ID of a latest snapshot of a file or a volume to which the to-be-read strip belongs, and the object ID of the to-be-read strip is an ID of an object to which the to-be-read strip belongs; determining, by the OSD, whether an object determined by using the object ID and the version number of the to-be-read strip is backed up; and if the object is backed up, reading data determined by using the object ID, the version number of the to-be-read strip, the offset of the to-be-read strip, and the size of the to-be-read strip, using the read data as the to-be-read strip, and sending the to-be-read strip to the client server; or if the object is not backed up, searching, one by one according to a descending order of snapshot times of objects, the objects whose object IDs are the same as the object ID of the to-be-read strip and version numbers are different from the version number of the to-be-read strip until an object that stores valid data in a storage location determined by using the offset of the to-be-read strip is found, using the found valid data as the to-be-read strip, and sending the to-be-read strip to the client server, where a version number of the object is corresponding to the snapshot ID that is of the latest snapshot of the file or the volume to which the to-be-read strip belongs and that exists before the object is generated.

According to a seventh aspect, an embodiment of the present invention provides a data processing apparatus, including: a strip request receiving module, configured to receive a strip write request sent by a client server, where the strip write request carries a to-be-written strip, a version number of the to-be-written strip, an offset of the to-be-written strip, and an object ID of the to-be-written strip, the version number of the to-be-written strip is corresponding to a snapshot ID of a latest snapshot of a file or a volume to which the to-be-written strip belongs, the offset of the to-be-written strip describes a location of the to-be-written strip in an object to which the to-be-written strip belongs, and the object ID of the to-be-written strip is an ID of the object to which the to-be-written strip belongs; and a strip storage module, configured to write the to-be-written strip into a storage location determined by using the object ID, the version number of the to-be-written strip, and the offset of the to-be-written strip.

According to an eighth aspect, an embodiment of the present invention provides a data processing apparatus, including: a strip request receiving module, configured to receive a strip write request sent by a client server, where the strip write request carries a to-be-written strip, a version number of the to-be-written strip, an offset of the to-be-written strip, and an object ID of the to-be-written strip, the version number of the to-be-written strip is corresponding to a snapshot ID of a latest snapshot of a file or a volume to which the to-be-written strip belongs, the offset of the to-be-written strip describes a location of the to-be-written strip in an object to which the to-be-written strip belongs, and the object ID of the to-be-written strip is an ID of the object to which the to-be-written strip belongs; and a strip storage module, configured to determine whether an object determined by using the version number of the to-be-written strip and the object ID is backed up, where if the object is backed up, the strip storage module is further configured to write the to-be-written strip into a storage location determined by using the object ID, the version number of the to-be-written strip, and the offset of the to-be-written strip; or if the object is not backed up, the strip storage module is further configured to create a spliced object by using the to-be-written strip, and then write the spliced object into a storage location determined by using the version number of the to-be-written strip and the object ID.

According to a ninth aspect, an embodiment of the present invention provides a data processing apparatus, including: a strip request receiving module, configured to receive a strip write request sent by a client server, where the strip write request carries a to-be-written strip, a version number of the to-be-written strip, an offset of the to-be-written strip, and an object ID of the to-be-written strip, the version number of the to-be-written strip is corresponding to a snapshot ID of a latest snapshot of a file or a volume to which the to-be-written strip belongs, the offset of the to-be-written strip describes a location of the to-be-written strip in an object to which the to-be-written strip belongs, and the object ID of the to-be-written strip is an ID of the object to which the to-be-written strip belongs; and a strip storage module, configured to: determine whether a strip determined by using the version number of the to-be-written strip, the object ID of the to-be-written strip, and the offset of the to-be-written strip is backed up; and if the strip is backed up, write the to-be-written strip into a storage location determined by using the version number of the to-be-written strip, the object ID of the to-be-written strip, and the offset of the to-be-written strip; or if the strip is not backed up, back up data that is in an object of a base version in the data storage apparatus and whose offset is the offset of the to-be-written strip and size is a size of the to-be-written strip to the storage location determined by using the version number of the to-be-written strip, the offset of the to-be-written strip, and the object ID of the to-be-written strip, where an object ID of the object of the base version is the same as the object ID of the to-be-written strip, and a version number of the object of the base version is a base version number; and write the to-be-written strip into a storage location determined by using the object ID of the to-be-written strip, the base version number, and the offset of the to-be-written strip.

According to a tenth aspect, an embodiment of the present invention provides a data processing apparatus, including: a strip request receiving module, configured to receive a strip write request sent by a client server, where the strip write request carries a to-be-written strip, a version number of the to-be-written strip, an offset of the to-be-written strip, and an object ID of the to-be-written strip, the version number of the to-be-written strip is corresponding to a snapshot ID of a latest snapshot of a file or a volume to which the to-be-written strip belongs, the offset of the to-be-written strip describes a location of the to-be-written strip in an object to which the to-be-written strip belongs, and the object ID of the to-be-written strip is an ID of the object to which the to-be-written strip belongs; and a strip storage module, configured to: determine whether an object determined by using the version number of the to-be-written strip and the object ID is backed up; and if the object is backed up, write the to-be-written strip into a storage location determined by using the object ID, a version number of the object, and the offset of the to-be-written strip; or if the object is not backed up, back up data in an object of a base version to a storage location determined by using the version number of the to-be-written strip and the object ID, where an object ID of the object of the base version is the same as the object ID of the to-be-written strip, and a version number of the object of the base version is a base version number, and the strip storage module is further configured to write the to-be-written strip into a storage location determined by using the object ID, the base version number, and the offset of the to-be-written strip.

According to an eleventh aspect, an embodiment of the present invention provides a data processing apparatus, including: a strip request receiving module, configured to receive a strip read request sent by a client server, where the strip read request carries a size of a to-be-read strip, an offset of the to-be-read strip, a version number of the to-be-read strip, and an object ID of the to-be-read strip, the version number of the to-be-read strip is corresponding to a snapshot ID of a latest snapshot of a file or a volume to which the to-be-read strip belongs, and the object ID of the to-be-read strip is an ID of an object to which the to-be-read strip belongs; and a strip reading module, configured to: determine whether a strip determined by using the object ID, the version number of the to-be-read strip, and the offset of the to-be-read strip is backed up; and if the strip is backed up, read data determined by using the object ID, the version number of the to-be-read strip, the offset of the to-be-read strip, and the size of the to-be-read strip, use the read data as the to-be-read strip, and send the to-be-read strip to the client server; or if the strip is not backed up, search, one by one according to a descending order of snapshot times of objects, the objects whose object IDs are the same as the object ID of the to-be-read strip and version numbers are different from the version number of the to-be-read strip until an object that stores valid data in a storage location determined by using the offset of the to-be-read strip is found, use the found valid data as the to-be-read strip, and send the to-be-read strip to the client server, where a version number of the object is corresponding to the snapshot ID that is of the latest snapshot of the file or the volume to which the to-be-read strip belongs and that exists before the object is generated.

According to a twelfth aspect, an embodiment of the present invention provides a data processing apparatus, including: a strip request receiving module, configured to receive a strip read request sent by a client server, where the strip read request carries a size of a to-be-read strip, an offset of the to-be-read strip, a version number of the to-be-read strip, and an object ID of the to-be-read strip, the version number of the to-be-read strip is corresponding to a snapshot ID of a latest snapshot of a file or a volume to which the to-be-read strip belongs, and the object ID of the to-be-read strip is an ID of an object to which the to-be-read strip belongs; and a strip reading module, configured to: determine whether an object determined by using the object ID and the version number of the to-be-read strip is backed up; and if the object is backed up, read data determined by using the object ID, the version number of the to-be-read strip, the offset of the to-be-read strip, and the size of the to-be-read strip, use the read data as the to-be-read strip, and send the to-be-read strip to the client server; or if the object is not backed up, search, one by one according to a descending order of snapshot times of objects, the objects whose object IDs are the same as the object ID of the to-be-read strip and version numbers are different from the version number of the to-be-read strip until an object that stores valid data in a storage location determined by using the offset of the to-be-read strip is found, use the found valid data as the to-be-read strip, and send the to-be-read strip to the client server, where a version number of the object is corresponding to the snapshot ID that is of the latest snapshot of the file or the volume to which the to-be-read strip belongs and that exists before the object is generated.

According to a thirteenth aspect, an embodiment of the present invention provides a data storage system, including a client server and an object storage device, where the client server is configured to receive a file write request, where the file write request carries to-be-written data, an offset of the to-be-written data, and a file name, and the to-be-written data is a part of a file; the client server obtains a file identifier FID according to the file name, performs a query on metadata of the file according to the FID to obtain a version number of the file, and uses the version number of the file as a version number of the to-be-written strip, where the version number of the file is corresponding to a snapshot ID of a latest snapshot of the file; the client server splits, according to the offset of the to-be-written data and a size of the to-be-written data, the to-be-written data into multiple strips that include the to-be-written strip, determines an ID of an object to which the to-be-written strip belongs, obtains an offset of the to-be-written strip, creates a strip write request, and sends the strip write request to the object storage device; and the object storage device is configured to: receive the strip write request, where the strip write request carries the to-be-written strip, the version number of the to-be-written strip, the offset of the to-be-written strip, and an object ID of the to-be-written strip, the version number of the to-be-written strip is corresponding to the snapshot ID of the latest snapshot of the file to which the to-be-written strip belongs, the offset of the to-be-written strip describes a location of the to-be-written strip in the object to which the to-be-written strip belongs, and the object ID of the to-be-written strip is the ID of the object to which the to-be-written strip belongs; and the OSD writes the to-be-written strip into a storage location determined by using the object ID, the version number of the to-be-written strip, and the offset of the to-be-written strip.

According to a fourteenth aspect, an embodiment of the present invention provides a data storage system, including a client server and an object storage device, where the client server is configured to: receive a volume write request, where the volume write request carries to-be-written data, an offset of the to-be-written data, and a volume identifier ID, and the to-be-written data is a part of a volume; perform a query on metadata of the volume according to the volume ID to obtain a version number of the volume, where the version number of the volume is corresponding to a snapshot ID of a latest snapshot of the volume; split, according to the offset of the to-be-written data and a size of the to-be-written data, the to-be-written data segment into multiple strips that include a to-be-written strip, determine an ID of an object to which the to-be-written strip belongs, and obtain an offset of the to-be-written strip; and create a strip write request and send the strip write request to the object storage device; and the object storage device is configured to: receive the strip write request, where the strip write request carries the to-be-written strip, a version number of the to-be-written strip, the offset of the to-be-written strip, and an object ID of the to-be-written strip, the version number of the volume is the version number of the to-be-written strip, the offset of the to-be-written strip describes a location of the to-be-written strip in the object to which the to-be-written strip belongs, and the object ID of the to-be-written strip is the ID of the object to which the to-be-written strip belongs; where the OSD writes the to-be-written strip into a storage location determined by using the object ID, the version number of the to-be-written strip, and the offset of the to-be-written strip.

According to a fifteenth aspect, an embodiment of the present invention provides a data storage system, including a client server and an object storage device, where the client server is configured to receive a file write request, where the file write request carries to-be-written data, an offset of the to-be-written data, and a file name, and the to-be-written data is a part of a file; and the client serving apparatus obtains a file identifier FID according to the file name, and performs a query on metadata of the file according to the FID to obtain a version number of the file, where the version number of the file is corresponding to a snapshot ID of a latest snapshot of the file;

the client server splits, according to the offset of the to-be-written data and a size of the to-be-written data, the to-be-written data into multiple strips that include a to-be-written strip, determines an ID of an object to which the to-be-written strip belongs, and obtains an offset of the to-be-written strip; and creates a strip write request and sends the strip write request to the object storage device; and the object storage device is configured to: receive the strip write request, where the strip write request carries the to-be-written strip, a version number of the to-be-written strip, the offset of the to-be-written strip, and an object ID of the to-be-written strip, the version number of the to-be-written strip is corresponding to the snapshot ID of the latest snapshot of the file to which the to-be-written strip belongs, the offset of the to-be-written strip describes a location of the to-be-written strip in the object to which the to-be-written strip belongs, and the object ID of the to-be-written strip is the ID of the object to which the to-be-written strip belongs; determine whether an object determined by using the version number of the to-be-written strip and the object ID is backed up; and if the object is backed up, write the to-be-written strip into a storage location determined by using the object ID, the version number of the to-be-written strip, and the offset of the to-be-written strip; or if the object is not backed up, create a spliced object by using the to-be-written strip, and then write the spliced object into a storage location determined by using the version number of the to-be-written strip and the object ID.

According to a sixteenth aspect, an embodiment of the present invention provides a data storage system, including a client server and an object storage device, where the client server is configured to: receive a volume write request, where the volume write request carries to-be-written data, an offset of the to-be-written data, and a volume identifier ID, and the to-be-written data is a part of a volume; perform a query on metadata of the volume according to the volume ID to obtain a version number of the volume, where the version number of the volume is corresponding to a snapshot ID of a latest snapshot of the volume; split, according to the offset of the to-be-written data and a size of the to-be-written data, the to-be-written data segment into multiple strips that include the to-be-written strip, determine an ID of an object to which the to-be-written strip belongs, and obtain an offset of the to-be-written strip; and create the strip write request and send the strip write request to the object storage device; and the object storage device is configured to: receive the strip write request, where the strip write request carries the to-be-written strip, a version number of the to-be-written strip, the offset of the to-be-written strip, and an object ID of the to-be-written strip, the version number of the to-be-written strip is corresponding to the snapshot ID of the latest snapshot of the volume to which the to-be-written strip belongs, the offset of the to-be-written strip describes a location of the to-be-written strip in the object to which the to-be-written strip belongs, and the object ID of the to-be-written strip is the ID of the object to which the to-be-written strip belongs; determine whether an object determined by using the version number of the to-be-written strip and the object ID is backed up; and if the object is backed up, write the to-be-written strip into a storage location determined by using the object ID, the version number of the to-be-written strip, and the offset of the to-be-written strip; or if the object is not backed up, create a spliced object by using the to-be-written strip, and then write the spliced object into a storage location determined by using the version number of the to-be-written strip and the object ID.

According to a seventeenth aspect, an embodiment of the present invention provides a data reading system, including a client server and an object storage device, where the client server is configured to: receive a file read request, where the file read request carries a file name, a size of to-be-read data, and an offset of the to-be-read data, and the to-be-read data is a part of a file; obtain a file identifier FID according to the file name, perform a query on metadata of the file according to the FID to obtain a version number of the file, and use the version number of the file as a version number of the to-be-read strip, where the version number of the file is corresponding to a snapshot ID of a latest snapshot of a file to which the to-be-read strip belongs; determine, according to the offset of the to-be-read data and the size of the to-be-read data, an ID of an object to which the to-be-read strip belongs, and obtain an offset of the to-be-read strip; and generate and send a strip read request; and the object storage device is configured to: receive the strip read request, where the strip read request carries a size of the to-be-read strip, the offset of the to-be-read strip, the version number of the to-be-read strip, and an object ID of the to-be-read strip, the version number of the to-be-read strip is corresponding to the snapshot ID of the latest snapshot of the file to which the to-be-read strip belongs, and the object ID of the to-be-read strip is the ID of the object to which the to-be-read strip belongs; determine whether a strip determined by using the object ID, the version number of the to-be-read strip, and the offset of the to-be-read strip is backed up; and if the strip is backed up, read data determined by using the object ID, the version number of the to-be-read strip, the offset of the to-be-read strip, and the size of the to-be-read strip, use the read data as the to-be-read strip, and send the to-be-read strip to the client server; or if the strip is not backed up, search, one by one according to a descending order of snapshot times of objects, the objects whose object IDs are the same as the object ID of the to-be-read strip and version numbers are different from the version number of the to-be-read strip until an object that stores valid data in a storage location determined by using the offset of the to-be-read strip is found, use the found valid data as the to-be-read strip, and send the to-be-read strip to the client server, where a version number of the object is corresponding to the snapshot ID that is of the latest snapshot of the file or a volume to which the to-be-read strip belongs and that exists before the object is generated.

According to an eighteenth aspect, an embodiment of the present invention provides a data reading system, including a client server and an object storage device, where the client server is configured to: receive a volume read request, where the volume read request carries a volume ID, a size of to-be-read data, and an offset of the to-be-read data, and the to-be-read data is a part of a volume; perform a query on metadata of the volume according to the volume ID to obtain a version number of the volume, and use the version number of the volume as a version number of the to-be-read strip, where the version number of the volume is corresponding to a snapshot ID of a latest snapshot of a volume to which the to-be-read strip belongs; determine, according to the offset of the to-be-read data and the size of the to-be-read data, an ID of an object to which the to-be-read strip belongs, and obtain an offset of the to-be-read strip; and generate and send a strip read request; and the object storage device is configured to: receive the strip read request, where the strip read request carries a size of the to-be-read strip, the offset of the to-be-read strip, the version number of the to-be-read strip, and an object ID of the to-be-read strip, the version number of the to-be-read strip is corresponding to the snapshot ID of the latest snapshot of a file or the volume to which the to-be-read strip belongs, and the object ID of the to-be-read strip is the ID of the object to which the to-be-read strip belongs; determine whether a strip determined by using the object ID, the version number of the to-be-read strip, and the offset of the to-be-read strip is backed up; and if the strip is backed up, read data determined by using the object ID, the version number of the to-be-read strip, the offset of the to-be-read strip, and the size of the to-be-read strip, use the read data as the to-be-read strip, and send the to-be-read strip to the client server; or if the strip is not backed up, search, one by one according to a descending order of snapshot times of objects, the objects whose object IDs are the same as the object ID of the to-be-read strip and version numbers are different from the version number of the to-be-read strip until an object that stores valid data in a storage location determined by using the offset of the to-be-read strip is found, use the found valid data as the to-be-read strip, and send the to-be-read strip to the client server, where a version number of the object is corresponding to the snapshot ID that is of the latest snapshot of the file or the volume to which the to-be-read strip belongs and that exists before the object is generated.

By applying the present invention, a combination of an object ID and a version number is used to replace an object ID in the prior art, which reduces a quantity of object IDs, and reduces a system resource loss.

BRIEF DESCRIPTION OF DRAWINGS

To describe the technical solutions in the embodiments of the present invention more clearly, the following briefly describes the accompanying drawings required for describing the embodiments. The accompanying drawings in the following description show merely some embodiments of the present invention, and other drawings may still be derived from these accompanying drawings.

FIG. 3A and FIG. 3B are schematic diagrams of a strip distribution policy according to an embodiment of the present invention;

DESCRIPTION OF EMBODIMENTS

The following clearly describes the technical solutions in the present invention with reference to the accompanying drawings in the embodiments of the present invention. Apparently, the described embodiments are merely a part rather than all of the embodiments of the present invention. All other embodiments obtained based on the embodiments of the present invention shall fall within the protection scope of the present invention.

Figure 1:
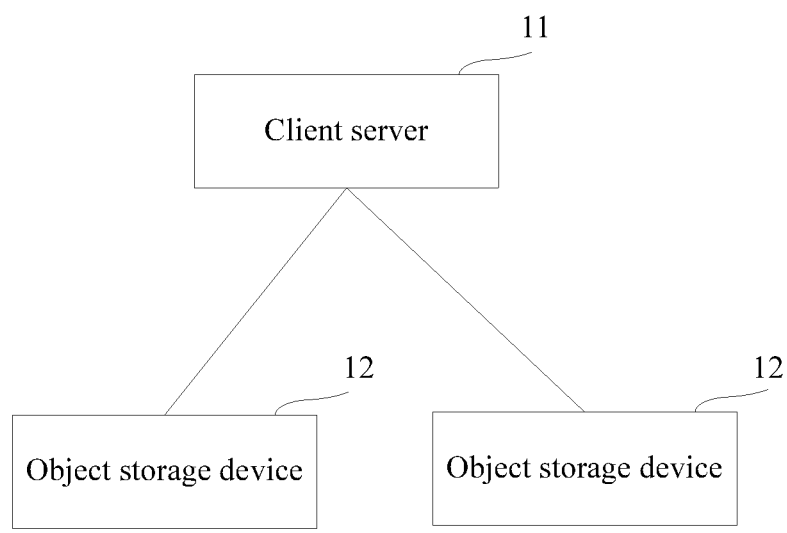
FIG. 1 is an architectural diagram of an object storage system according to an embodiment of the present invention.

As shown in FIG. 1, FIG. 1 is an architectural diagram of an object storage system, which may include a client server 11 and an object storage device 12. The object storage device 12 may provide an object (Object) storage service for the client server 11.

An object-based storage device (Object-based Storage Device, OSD) may be referred to as an object storage device. In an object storage technology, a storage system is created based on the object storage device, and each object storage device may have particular intelligence and can automatically manage data distribution on the object storage device.

An object is a basic data storage unit in the system. A file is used an example, and an object is actually a combination of a part of data of the file and attribute information of this part of data, where the attribute information is also referred to as metadata (Meta Data), and a file-based redundant array of independent disks (RAID) parameter, data distribution, service quality, and the like may be defined. However, in a traditional storage system, a file or a block is used as a basic storage unit, and in a block storage system, an attribute of each block in the system further needs to be always tracked, and an object maintains an attribute of the object by communicating with the storage system. In the object storage device, each object has an object identifier (ID), so as to facilitate access to the object.

An OSD has particular intelligence, and may have a CPU, a memory, and a storage medium. Compared with a block device, the OSD may provide a different access interface. In a same storage system, there may be one or more OSDs, and in FIG. 1, two OSDs are used as an example. Currently, a blade structure is internationally and generally used to implement the object storage device. The OSD may provide three functions:

(1) Data storage: The OSD manages objects and stores the objects in the storage medium such as a disk, the OSD does not provide a block interface access manner, and when a client requests data, data reading and writing is performed by using an object ID and an offset.

(2) Intelligent distribution: The OSD optimizes distribution of locally stored data by using the CPU and the memory that are of the OSD, and supports data prefetching. Because the OSD can intelligently support object prefetching, a data read speed can be optimized.

(3) Management of metadata of each object: The OSD manages metadata of an object stored in the OSD, where the metadata is recorded in a data structure that is referred to as an index node (index node, inode), and the metadata generally includes information such as an object size and a quantity of included strips. In a traditional network attached storage (NAS) system, the metadata is maintained by a file server. In an object storage architecture, the metadata may be managed by a metadata server, or main metadata management work in the system may be implemented by the OSD, which reduces costs of a client.

A current storage mode is copy on first write (COFW), which is sometimes referred to as copy on write (COW) for short. That is, when new data is written into a storage location in a storage device for the first time, original data in this storage location is first read and written into another storage location (the another storage location is a storage location reserved for a snapshot and is referred to as snapshot space), and then the new data is written into the storage device. It can be learned from an execution process of COW that one read operation and two write operations need to be performed in this implementation manner.

Redirect on first write (Redirect On First Write, ROW) is another method for storing new data. In ROW, the new data is written into a reserved storage location, and a storage location of old data remains unchanged. Compared with COW, one write operation can be reduced in ROW.

In the object storage technology, most metadata management work may be distributed to each intelligent OSD, and each OSD is responsible for managing distribution and retrieval of locally stored data, where 90% of metadata management work is distributed to an intelligent storage device, and only 10% of metadata management work is executed by the metadata server, so that performance of metadata management in the system is improved. In addition, the OSD is a device connected to a network, and includes a storage medium, such as a disk or a magnetic tape, and can manage the locally-stored data with enough intelligence. A storage server directly communicates with the OSD and accesses data stored in the OSD, and because the OSD is intelligent, the file server does not need to get involved.

An object is a combination of data and a data attribute. The data attribute may be set according to an application requirement, and includes data distribution, service quality, and the like. The client server 11 may be a server based on the NAS protocol or a server storage area network based on the Storage Area Network (SAN) protocol. That is, this embodiment of the present invention is applicable to both a file system and a block system.

For data in network attached storage (NAS) system, the object in this embodiment of the present invention comes from a file, the file is split into multiple fragments, and one fragment and information such as an attribute and metadata that are of this fragment jointly constitute one object. Similarly, for data in a storage area network (SAN), a volume (Volume) is split into fragments.

In the prior art, an object is determined by using an object ID, and therefore, an ID of each object is unique. After a same file is updated for multiple times, object IDs of a large quantity may be generated, and it requires large storage space to record the object IDs. In the embodiments of the present invention, an object is determined by using a combination of an object ID and a version number. When data of a file is updated for multiple times, if an offset range of the updated data remains unchanged, an object ID corresponding to the updated data may remain unchanged, and only different object version numbers need to be updated, so that a total quantity of object IDs maintained in a system is reduced. In addition, in the solutions in the embodiments of the present invention, there is a correspondence between an object version number and a snapshot ID, and in an interval of taking two snapshots, all objects in a same file use a same version number regardless of how many times data in the file is updated, and therefore, the version number occupies very small storage space.

In the prior art, after content of a file or a volume is updated, for metadata of a modification-related object, metadata stored at a file layer (a semantic layer of a volume for a block system) needs to be updated, and an amount of updated data is relatively large. In addition, an access node may access an OSD by using a client server, and if all different access nodes can access the modification-related object, metadata synchronization needs to be performed between nodes. Specifically, after an access node updates metadata of an object, another access node may be triggered to integrally update all object IDs in a file in which the modified object is located, and frequent synchronization causes severe metadata expansion. However, in the solutions provided in the embodiments of the present invention, an object ID does not need to be changed, only a version number needs to be updated at an OSD layer, and an amount of updated data is far less than that in the prior art. In addition, the object ID in the embodiments of the present invention is obtained by means of calculation by using an offset.

Figure 2:
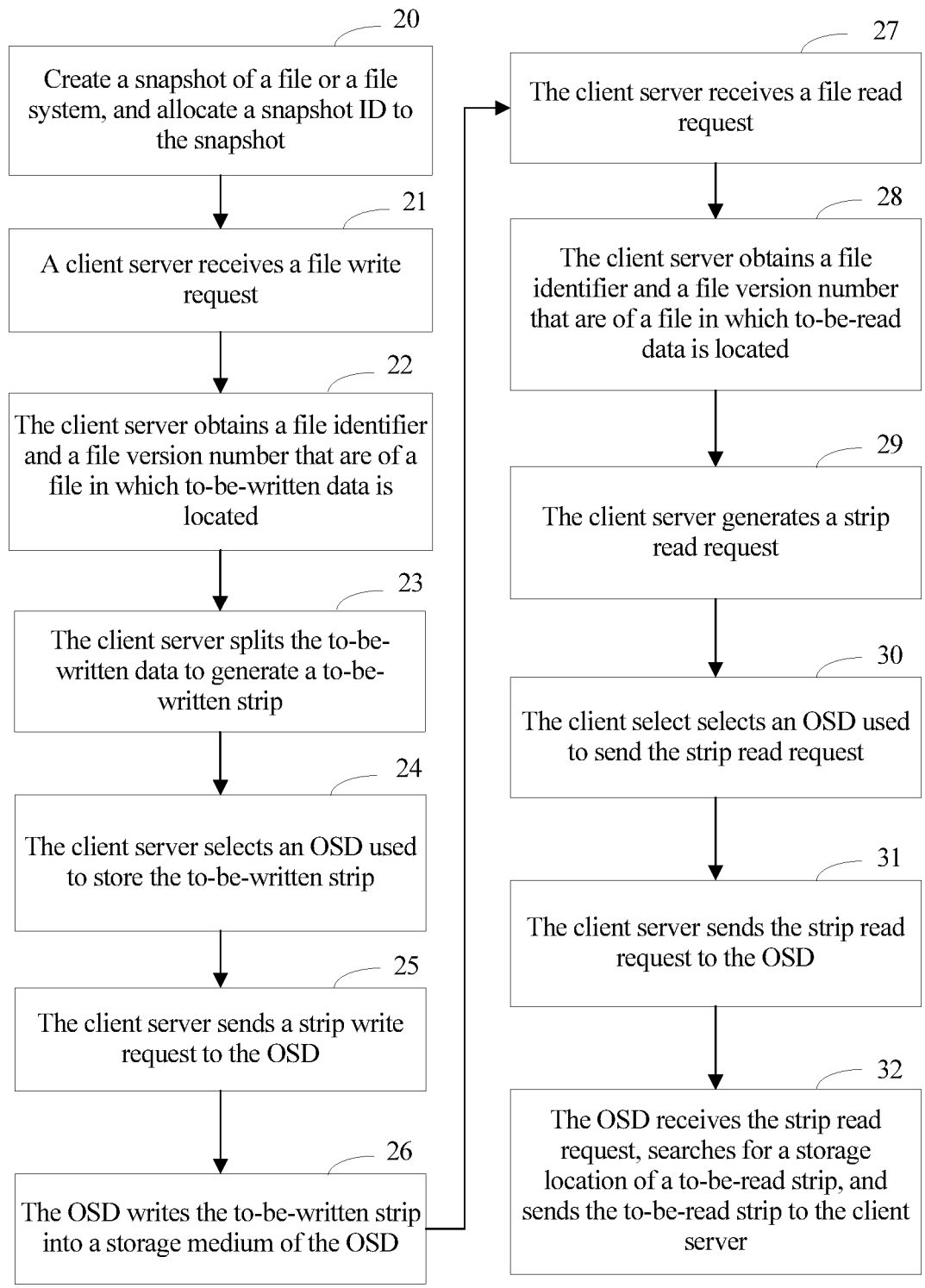
FIG. 2 is a flowchart of an embodiment of a data processing method according to the present invention.

As shown in FIG. 2, a file request is used as an example to specifically describe a flowchart of an embodiment of a data processing method according to the present invention. In another implementation manner, each term about a file system is replaced with a corresponding term about a block system. For example, a file is replaced with a volume, file metadata is replaced with volume metadata, a file version number is replaced with a volume version number, and a file ID is replaced with a volume ID. Differences lie in that: (1) the volume metadata is stored in another location, not stored in an inode; (2) the volume ID may be directly obtained and does not need to be obtained by means of conversion from a volume name.

Step 20: Create a snapshot, where a target of the snapshot is a file or a file system that includes files, that is, the target of the snapshot includes the files; and allocate a snapshot ID to the snapshot.

The snapshot is created in two manners. In one manner, a snapshot of a file is created, and the target of the snapshot is a single file. In the other manner, a snapshot of a file system is created, and the target of the snapshot is an entire file system, where the file system includes multiple files. In the two manners, storage locations of file metadata are different.

In the manner of creating a snapshot of a file, a file is selected to create a snapshot, a snapshot name is set for the file, and if the snapshot name has not been used, the snapshot ID is allocated to the snapshot of the file. The snapshot ID of the file is used as metadata of the file and stored in an inode (index node) of the file. It should be noted that the snapshot ID is a mark of the snapshot. For example, a time point for creating the snapshot is used as the snapshot ID, or increasing numbers are used as snapshot IDs according to an order of time points for creating snapshots.

In the manner of creating a snapshot of a file system, a file system is selected to take a snapshot, and if a snapshot name has not been used, the snapshot ID is allocated to the snapshot of the file system, and then the allocated snapshot ID is stored in a root inode of the file system. In this manner, it may be considered that a snapshot ID of each file in the file system is the same as the snapshot ID of the file system. A difference from the previous manner lies in that the snapshot ID of the file is stored in the root inode of the file system, but not in the inode of the file.

In addition to the snapshot ID of the file, the file metadata further includes a file identifier (FID), and the file metadata may further include information such as a file size (Size) and a writing time.

It should be noted that step 20 is a preset step and has relative independence from other steps in this method embodiment. This embodiment of the present invention mainly describes operations performed by a client server and an OSD after a snapshot is created and before a next snapshot is created.

Step 21: A client server receives a file write request, where the file write request carries to-be-written data, an offset of the to-be-written data, and a file name, and the to-be-written data is a part of a file.

Specifically, this step may be executed by a program in a file system of the client server. The file write request is a write request that can be identified by the file system. The file write request may be creating a file, or using the to-be-written data to update a file that already exists, where the to-be-written data is a part of the file or the entire file.

The file write request may further carry a size of the to-be-written data, so that the to-be-written data is split into a strip according to the offset of the to-be-written data in a subsequent step; or may not carry a size of the to-be-written data, because the size of the to-be-written data can be obtained by measuring the to-be-written data.

The offset of the to-be-written data describes a relative location of the to-be-written data in the file. Specifically, the offset of the to-be-written data may describe a distance between a start location of the to-be-written data and a file header. If the offset of the to-be-written data is 0, it indicates that the start location of the to-be-written data is a start location of a to-be-written file. If the offset of the to-be-written data is 1 KB, it indicates that a distance between the start location of the to-be-written data and the start location of the file is a data size of 1 KB.

Optionally, the file write request may further carry a file path of the file write request, where the file path indicates storage locations of the file and a mapping relationship table. A file is jointly determined by using a file path and a file name. For example, a combination of the file path and the file name is /root/mma/a1, where /root/mma/ is the file path, a1 is the file name, and the file and the mapping relationship table are stored in the path /root/mma/.

Different files may have different file names, and file names in a same file path are not the same.

Optionally, the write request may further carry a storage location of a mapping relationship table, where the mapping relationship table records a mapping relationship between the file name and the FID.

A snapshot ID is generated each time a snapshot is created, each snapshot ID has a corresponding file version number, and the snapshot ID is in a one-to-one correspondence with the file version number. In addition, a change rule of snapshot IDs corresponding to adjacent snapshot times is the same as a change rule of file version numbers corresponding to the adjacent snapshot times.

Before step 22 is executed, a mapping relationship between the snapshot ID and the file version number may be recorded.

The following two steps are included:

(1) Back up currently newest file metadata, which may be specifically implemented by backing up an inode. For a snapshot of a file level, an inode of a file is backed up, and for a snapshot of a file system level, an inode of a file system is backed up, including both an inode of a file and a root inode of the file.

(2) Update a version number in the inode. If a write mode that is set in the client server is ROW, the updated version number is stored in the backed-up inode. If a write mode that is set in the client server is COW, the updated version number is stored in an inode that is generated by means of backup, and optionally, the backed-up inode may also record the updated version number. For example, if an inode A is backed up to generate an inode B, the inode A is a backed-up inode, and the inode B is an inode that is generated by means of backup.

The snapshot ID is generated in step 20. There is a correspondence between the file version number and the snapshot ID, and the snapshot ID is corresponding to a snapshot time; therefore, it may also be considered that there is a correspondence between the file version number and the snapshot time. The correspondence means that each file version number is corresponding to one unique snapshot ID, and a change rule of the file version number is similar to that of the snapshot ID. For example, a larger snapshot ID indicates a larger file version number, or a larger snapshot ID indicates a smaller file version number. A snapshot with a later snapshot time among multiple snapshots has a larger ID.

It should be noted that, in a data writing method based on a block system, including a SAN, a volume is marked by using a volume ID instead of a file name, and a function of the volume ID is similar to that of the FID. In addition, in the volume, there is no concept similar to the file path. Therefore, a step of performing a query on the mapping relationship table is no longer required in step 22, and a query may be directly performed on volume metadata by using the volume ID to obtain a volume version number.

Step 22: The client server performs a query on a mapping relationship table by using the file name, to obtain a file identifier (FID) of the file in which the to-be-written data is located, and performs a query on file metadata according to the FID to obtain a file version number.

The mapping relationship table records a mapping relationship between the file name and the FID, and the file name is in a one-to-one correspondence with the FID. The storage location of the mapping relationship table may be carried in the file write request and is obtained by the client server from the write request, or the mapping relationship table may be prestored in the client server by the client server, and the client server finds the mapping relationship table according to the file path, or the mapping relationship table may be stored in another storage device.

The obtained file version number may be further updated to the metadata. After the update, the file metadata records the FID and the file version number, and the file version number may be obtained by performing a query on the file metadata by using the FID. The file metadata may be stored in information about an inode. The file path indicates a storage location of the inode. It can be learned from the foregoing description that, for ROW, because the version number is stored in the backed-up inode, the backed-up inode is read in this step. For COW, because the version number is stored in the inode that is generated by means of backup, the inode that is generated by means of backup is read in this step.

There is a one-to-one correspondence between the file version number and the snapshot ID of the file, and after generating the snapshot ID, the client server generates the file version number that is in a one-to-one correspondence with the snapshot ID. For example, the snapshot ID may be directly used as the file version number, or a snapshot ID obtained after an operation is performed may be used as the file version number. If a snapshot that is created later has a larger snapshot ID, an optional manner is: the snapshot that is created later has a larger value of the snapshot ID; another optional manner is: the snapshot that is created later has a smaller value of the snapshot ID.

In the embodiments of the present invention, sometimes a version number of a to-be-written strip is also used. The version number of the to-be-written strip is a file version number of a file to which the to-be-written strip belongs. That is, strip version numbers of different strips from a same file are the same. Similarly, an object version number (or a version number of an object) is the file version number of the file to which the to-be-written strip belongs. That is, object version numbers of different objects from a same file are the same.

Step 23: The client server splits the to-be-written data into multiple strips that include a to-be-written strip (strip), and obtains, according to a strip distribution policy, an offset of the to-be-written strip and an ID of an object to which the to-be-written strip belongs, where the ID of the object to which the to-be-written strip belongs is also referred to as an object ID.

The client server splits the data into one or more strips according to a strip size (Size). A strip is data of a particular size. When the size of the to-be-written data is less than or equal to a size of a single strip, the to-be-written data is split into one strip; if the size of the to-be-written data is greater than the size of the single strip, the to-be-written data is split into multiple strips. Sizes of strips split from a same file are the same. The strip size (Size) may be stored in the file metadata, and in this case, different files may use different strip sizes. Alternatively, the strip size may not be stored in the metadata of the file to which the object belongs, files in the entire file system share one strip size, and in this case, different files use a same strip size, and the strip size is stored in the root inode of the file system. An object may be considered as a container, which can accommodate a strip.

For example, if the to-be-written data is split into several data strips, the strip in this step refers to a data strip obtained by means of splitting; or after the to-be-written data is split into a data strip, if several verification strips are further generated to perform data protection on the data strip, the strip in this step includes both the data strip and the verification strip.

A total quantity of strips included in each object may be stored in the file metadata, and in this case, a total quantity of strips included in objects in different files may be different; or a total quantity of strips included in each object may not be stored in the metadata of the file to which the object belongs, and in this case, a total quantity of strips included in objects in different files is the same.

It should be noted that a start location of the to-be-written data in the file may be learned from the offset of the to-be-written data, and an end location of the to-be-written data in the file may be learned from the offset of the to-be-written data and the size of the to-be-written data. If the start location of the to-be-written data is not an integer multiple of the strip size, or a value of the end location plus 1 is not an integer multiple of the strip size, the to-be-written data is first split according to the strip size, and splitting boundaries are integer multiples of the strip size. If data whose size is less than one strip (this type of data may also be referred to as dirty data of a strip) is generated after splitting, the data is supplemented to form a strip. Because of a supplementing operation in this step, unless otherwise specified, both a strip and an offset of the strip that are mentioned in a subsequent step refer to a strip and an offset of the strip that are obtained after supplementing.

For example, if an offset range of the to-be-written data is 4 KB-300 KB, and the strip size is 256 KB, 0 KB and 256 KB are used as boundaries for splitting the to-be-written data, and two data blocks are formed, where offset ranges of the two data blocks in the to-be-written data are respectively 4 KB-255 KB and 256 KB-300 KB. Supplementing is performed on the two data blocks, and two strips whose sizes are 256 KB are formed. Data (whose size is 4 KB-0 KB=4 KB) used to supplement a former data block comes from a previous strip, and data (whose size is 511 KB-300 KB=211 KB) used to supplement a latter data block comes from a next strip. The offset of the to-be-written data is a relative location of the to-be-written data in the file.

Another supplementing method is as follows: If the start location of the to-be-written data is not an integer multiple of the strip size, or a value of an end location offset plus 1 is not an integer multiple of the strip size, a supplementing operation may be performed on the to-be-written data of strip, so that sizes of strips obtained after splitting are consistent and there is no margin in the strip. Data that is already stored in the OSD may be read and used as data for supplementing.

For example, if an offset range of the to-be-written data is 4 KB-300 KB, and the strip size is 256 KB, the to-be-written data may be supplemented to form data whose offset range is 0 KB-511 KB, and then the data is split into two strips whose offset ranges are 0 KB-255 KB and 256 KB-511 KB, so that a size of each strip is 256 KB.

The strip distribution policy is provided by the file system of the client server. What is described is the object to which the strip belongs, that is, a correspondence between the strip and the object, which specifically may be a correspondence between the offset of the strip and the object.

An object ID uniquely identifies an object, IDs of objects that belong to a same file are different, and IDs of objects in different files are also different.

Optionally, there may be a correspondence between the object ID and the FID of the file to which the object belongs. That is, for example, a file from which an object represented by this object ID comes may be learned from the object ID.

For example, an optional manner for generating the object ID is as follows: The object ID includes binary numbers of 64 bits, where former 32 bits are an ID of the file to which the object belongs, latter 32 bits are assigned by the client server, the latter 32 bits are unique in the file, and latter 32 bits of different objects in a same file are different. For example, an identifier of an object in a file is used. In this manner, the corresponding FID may be learned from the former 32 bits of the object ID. Similarly, in the block (block) system, a relationship between an object ID and a volume ID may also be established.

Another optional manner for generating the object ID is as follows: The object ID includes binary numbers of 48 bits, where former 16 bits are corresponding to the file, and former 16 bits of different files are different; latter 32 bits are assigned by the client server, the latter 32 bits are unique in the file, and latter 32 bits of different objects in a same file are different.

In another embodiment, there may also be no correspondence between the ID and the FID of the file to which the object belongs.

FIG. 3A and FIG. 3B show two different strip distribution policies. A strip index describes an offset relationship of a strip in a file, and the strip index is an integer greater than or equal to 0, where the smallest strip index is 0, the second smallest strip index is 1, and the third smallest strip index is 2, . . . , and so on. Two strips with adjacent index values also have adjacent offsets in the file.

An optional strip distribution policy is shown in FIG. 3A: (1) sizes of objects that belong to a same file are fixed, and sizes of strips in a same file are the same, which means that a total quantity of strips included in different objects is the same; (2) a previous object is first filled and then a next object is filled by strips according to an index order, that is, several consecutive strips belong to a same object according to an order of offset sizes of strips in the to-be-written data. As shown in FIG. 3A, each object fixedly includes four strips. For example, a strip size is 256 KB, and each object has four strips, that is, an object size is 256 KB×4=1024 KB. In this case, the first object stores the strip 0 to strip 3, the second object stores the strip 4 to the strip 7, and the third object stores the strip 8 to strip 11, . . . and accordingly, an ID of the first object is 0, an ID of the second object is 1, and an ID of the third object is 2, . . . .

A strip offset is used to describe a relative location of a strip in an object, and may be specifically a relative location of start data of the strip in the object. Strip offset=(Strip index % Quantity of strips in an object)×Strip size, where % refers to calculating a remainder after division of a former term by a latter term. Therefore, a value of "Strip index % Quantity of strips in an object" is a remainder obtained after the strip index is divided by the quantity of strips in the object.

Another optional strip distribution policy is shown in FIG. 3B: (1) sizes of objects in a same file are not fixed, that is, a total quantity of strips in different objects of the same file may be different; (2) a total quantity of objects is fixed, that is, different files have objects of a same quantity, and as shown in FIG. 3B, there are three objects in total. For example, if a strip size is 256 KB, and a total quantity of objects is fixed to 3, the first strip (strip 0) is located in the first object (object 0), the second strip (strip 1) is located in the second object (object 1), . . . , and by analogy, the fourth strip (strip 3) is also located in the first object, and the fifth strip (strip 4) is also located in the second object. A strip index is an integer greater than or equal to 0, and describes a location relationship between strips in a file. An offset of each strip in an object to which the strip belongs may also be determined, and an identifier of an object in the file may be a remainder obtained after the strip index is divided by a total quantity of objects in the file. A specific calculation formula may be: Identifier of an object in a file=Strip index % Quantity of objects in a file, and Strip offset=(Strip index/Quantity of objects)×Strip size.

The strip index may be determined by using the offset of the to-be-written data. For example, for an entire file, start data obtained after the file is split is located in a strip (strip 0) in the first object, and the offset of the current to-be-written data is located in the fifth strip (strip 4) in the object 1. In this case, in strips generated after the to-be-written data is split, an index of the first strip is 4, and an index of another strip is obtained by analogy.

The foregoing describes two solutions for calculating the ID of the object to which the strip belongs, and according to different strip distribution policies, there may also be another implementation solution. Parameters used in different distribution policies may be different, and these parameters may be generally obtained by performing a query on the client server.

Because processing manners of all strips are the same, the following uses only a particular "to-be-written strip" as an example for description.

Step 24: The client server selects an OSD used to store the to-be-written strip.

Specifically, this step may be executed by an object storage client of the client server.

An optional calculation method is determining, according to the FID of the to-be-written strip, the OSD for storing the to-be-written strip. For example, a hash value of the FID is divided by a total quantity of OSDs, and a remainder is used as an identifier of the OSD for storing the to-be-written strip, that is, the hash value of the FID mod the total quantity of OSDs. There may also be another solution. For example, the client server randomly selects an OSD to store a to-be-written strip that belongs to an object, and strips that belong to a same object may be stored in a same OSD.

In addition, the OSD for storing the strip may also be jointly determined according to the FID and an object ID that are of the to-be-written strip. Actually, a calculation method may be randomly selected provided that an OSD can be selected.

Step 25: The client server sends a strip write request to the OSD, where the strip write request carries the to-be-written strip, a version number of the to-be-written strip, the offset of the to-be-written strip, and the ID of the object to which the to-be-written strip belongs, and optionally, may further include a size of the to-be-written strip.

Optionally, in a case in which the OSD supports both ROW and COW, a write mode may be further sent, so that the OSD writes the to-be-written strip according to the write mode specified by the client server. The write mode is ROW or COW. If the OSD supports only one write mode, the write mode may not be sent to the OSD.

Step 26: The OSD receives the strip write request and writes the to-be-written strip into a storage medium of the OSD.

When the OSD supports only one write mode, the OSD may directly write the to-be-written strip into the storage medium in a default write mode without a need to confirm whether the write mode is ROW or COW.

When receiving data, the OSD first temporarily stores the data in a buffer, and in this step, the to-be-written data in the buffer may be stored in the storage medium.

A strip offset describes a relative location of a strip in an object, which, specifically, may be a relative location of start data of the strip in the object, and Strip offset+Strip size=Relative location of end data of a strip in an object.

A backup mark of data is in the OSD, and a granularity of the backup mark of the data may be queried in the OSD by using the object ID as an index, or it may be set by default that all strips received by the OSD are stored according to a same granularity of the backup mark. Strips that belong to a same file use a same type of recording granularity. An actual device may support only a case in which an object is used as the granularity of the backup mark, or may support only a case in which a strip is used as the granularity of the backup mark. In this case, the OSD may directly perform storing without a need to query the granularity of the backup mark.

In the OSD, an object can be jointly determined by using two parameters: an object ID and a version number, and therefore, a set that includes the two parameters is referred to as an object key parameter in this embodiment. After the object is determined, a strip may be determined by further using a strip offset, that is, a strip can be jointly determined by using three parameters: the object ID, the version number, and the strip offset, and therefore, a set that includes the three parameters is referred to as a strip key parameter.

In the OSD, the object key parameter may indicate a storage location that is used to store an object, and specifically, may indicate a start address that is to be used by the object. Optionally, the object key parameter may indicate an address segment that is to be used by the object. Similarly, the strip key parameter may also indicate a start address or an address segment that is used to store a strip. The start address and the address segment may be physical addresses or logical addresses.

There are multiple possible cases of searching, by using the object key parameter, for a storage location of an object determined by using the object key parameter. In one case, before receiving the strip write request, the OSD already records an object key parameter carried in the strip write request, and allocates a storage location for a strip represented by this group of key parameters. In another case, the OSD does not record this group of key parameters, and does not allocate the storage location for the strip represented by this group of key parameters, and after receiving the strip write request, the OSD allocates a storage location to this group of object key parameters.

An object set is a set of objects with a same object ID and different version numbers, where the object set includes at least one object, and the object set may be a logic concept and does not need to be actually divided.

An object ID is determined according to a range of an offset that is of data carried in an object and that is in a file. If multiple snapshots of a same file are taken, and data that changes is stored in an OSD each time a snapshot is taken, data with a same offset among the data that changes has a same object ID.

In the OSD, a mark is used to indicate whether an object or a strip is backed up. A granularity of a backup mark may be a strip or an object. If a smallest marked unit is a strip, the granularity of the backup mark is a strip, and if a smallest marked unit is an object, the granularity of the backup mark is an object.

A backup mark of an object indicates that an object determined by using an object ID and a version number has already been backed up. Specifically, the backup mark of an object indicates whether an object corresponding to the object ID is backed up after a snapshot corresponding to the version number is created, where 1 indicates that the object has been backed up, and 0 indicates that the object has not been backed up. There are specifically two cases in which the backup mark of the object is 0, where one case is that the object determined by using the object ID and the version number is modified and a backup operation is not executed yet; the other case is that the object determined by using the object ID and the version number is not modified.

A backup mark of a strip indicates that a strip determined by using an object ID, a version number, and a strip offset has already been backed up. Specifically, the backup mark of a strip indicates whether a strip corresponding to the object ID and the strip offset is backed up after a snapshot corresponding to the version number is created, where 1 indicates that the strip has been backed up, and 0 indicates that the strip has not been backed up. There are specifically two cases in which the backup mark of the strip is 0, where one case is that the strip determined by using the object ID, the version number, and the strip offset is modified and a backup operation is not executed yet; the other case is that the strip determined by using the object ID, the version number, and the strip offset is not modified.

By comparing object version numbers, snapshot times of different objects in a same object set may be determined.

There are four possible manners in total in which the to-be-written strip is written into the OSD: (1) The write mode is ROW, and the granularity of the backup mark is a strip. (2) The write mode is ROW, and the granularity of the backup mark is an object. (3) The write mode is COW, and the granularity of the backup mark is a strip. (4) The write mode is COW, and the granularity of the backup mark is an object. An OSD may support one or more of the four possible manners. The following separately describes the four possibilities.

Manner 1: For ROW, the granularity of the backup mark of the data in the OSD is a strip.

The to-be-written strip is directly written into the OSD according to a storage location determined by using a strip key parameter in the strip request. In addition, after writing is complete, the storage location (a start storage address or an address segment) occupied by the written strip may be further marked as "written valid data" in this step. A storage location occupied by the strip stored in the storage medium of the OSD is also referred to as strip space.

A bit may be used to mark whether each strip in an object is backed up. For example, a flag bit of a storage location of this strip is set to 1, where 1 indicates that data is written, and 0 indicates that there is no data. A strip index may be used to describe an order of strips in an object, and a flag bit is used to mark each strip in the object. For example, there are four pieces of strip space in total, where 0000 indicates that no data is written into the four pieces of strip space; 0010 indicates that data is written into only the second piece of strip space; 0101 indicates that data is written into the first piece of strip space and the third piece of strip space, and no data is written into the second piece of strip space and the fourth piece of strip space.

It should be noted that the $N^{th}$ (N is a natural number) piece of strip space described in this embodiment refers to a relative location of the strip space in an object to which a strip belongs, and does not refer to a strip index.

In a method for determining an identifier of a strip in an object, for example, an offset of the strip may be used for determining, a smaller offset value indicates a smaller strip identifier value, a difference between identifiers of adjacent strips is 1, and the smallest strip identifier is 0. If the strip distribution policy is the policy described in FIG. 3A in this step, a quick calculation method for determining a strip identifier is: Strip identifier=Strip offset/Strip size. The strip offset is an offset of a strip in an object. If this piece of strip space has already been marked as "backed up" before, marking may be not repeatedly performed in this step provided that this mark remains unchanged.

Manner 2: For ROW, the granularity of the backup mark of the data in the OSD is an object.

The granularity for determining the backup mark in Manner 2 is different compared with that in Manner 1, and determining a flag bit of a strip is changed into determining a flag bit of an object.

A query is performed in a writing record in the OSD by using an object key parameter carried in the strip write request, to determine whether valid data is stored in a storage location indicated by the object key parameter. In this embodiment, it may be determined, by determining a flag bit, whether valid data is stored in a storage location. For example, if the flag bit is 1, it indicates that valid data is stored, and if the flag bit is 0, it indicates that no valid data is stored in the storage location. It may be determined, by determining the flag bit of the storage location indicated by the object key parameter, whether the strip write request received this time is the first write operation performed on this object after a snapshot is created. For example, when the flag bit is 0 or no flag bit is found, it indicates that the first writing after the snapshot is taken, and when the flag bit is 1, it indicates that non-first writing after the snapshot is taken.

If the strip write request is not the first writing performed on this object after the snapshot is taken, the to-be-written strip is directly written into a storage location occupied by this object, and a specific writing location may be determined by using the strip key parameter.

If the strip write request is a write request that is for this object and that is received for the first time after the snapshot of this object is taken, the to-be-written strip in the strip write request and a combination of strips obtained from another object in the OSD are spliced into a complete object that is referred to as a spliced object. Specifically, an object from which the remaining part comes is an object with a largest version number (but is smaller than a version number carried in the strip write request) in objects that have valid data.

That is, an object with a largest version number is selected from an object that has valid data and that belongs to an object set of the object ID of the to-be-written strip, and a strip whose offset is different from the offset of the to-be-written strip is obtained, to constitute the spliced object jointly with the to-be-written strip. A set of an object that is stored in the OSD and whose object ID is the same as the object ID of the to-be-written strip and version number is different from the version number of the to-be-written strip is referred to as the object set of the object ID of the to-be-written strip. When the write mode is ROW, a later snapshot time indicates a larger corresponding object version number, and the object ID of the to-be-written strip is the ID of the object to which the to-be-written strip belongs.

For example, each object includes 32 strips, and the to-be-written strip received by the OSD is the $15^{th}$ strip in the 32 strips, and for the remaining 31 strips, that is, objects from which the $1^{st}$ to the $14^{th}$ strips and the $16^{th}$ to the $32^{th}$ strips come are objects that are recorded in the OSD after a previous snapshot is taken and that have valid data and a same object ID.

After writing is complete, a flag bit of this object is recorded as backed up. For example, the flag bit is set to 1, which means that the first strip write operation after the snapshot is taken is complete, that is, if any strip in this object is written again before a next snapshot is taken, it is not the first writing performed on this object after the snapshot is taken, and therefore, there is no need to perform a backup operation, and the strip is directly written.

It can be learned from the foregoing description that a same object ID may corresponding to multiple objects, each snapshot ID is corresponding to one object, these objects are written into the OSD at different times, version numbers of objects with adjacent writing times are adjacent, and a later writing time indicates a larger version number.

After this write operation is complete, the object newly written this time is a new member in the object set.

Manner 3: The write mode is COW, and the granularity of the backup mark of the data is a strip.

A storage location may be determined by using an object key parameter in the strip write request and the strip offset. It is first detected whether data is already stored in the storage location determined by using the key parameter of the to-be-written strip, and if a result of determining is that the data is not stored in the storage location determined by using the key parameter of the to-be-written strip or that no record is found, it means that this write request is the first write request after the snapshot is created, and a backup operation needs to be first performed and then the to-be-written strip is written.

In a general case, before a next snapshot is taken and after only the first strip write request is received, strip data needs to be backed up, and the data is backed up to a storage location determined by using the object ID of the to-be-written strip, the version number of the to-be-written strip, and the offset of the to-be-written strip. Therefore, a newest strip stored in the OSD needs to be first backed up to the storage location indicated by the key parameter of the to-be-written strip, and a strip received this time is then written into the storage location in which data is backed up. The newest strip stored in the OSD is a latest strip that is sent by the client server. In this embodiment, the newest strip is a strip that is in strips stored in the OSD and has the object ID of the to-be-written strip and whose version number is 0 and offset is the same as the offset of the to-be-written strip. A write operation of the to-be-written strip may be directly performed if a strip write request is subsequently received, and backup does not need to be performed.

In COW, a newest object stored in the OSD always uses a same version number. For example, 0 or null (Null) is used as the version number, which is referred to as a base version number in this embodiment. Among other objects in the object set and among version numbers except the base version number, an object with a smaller version number has a later corresponding snapshot time.

In ROW or COW, before the first snapshot of a file is taken, when data is written into the OSD, a used strip version number is the base version number. A value of the base version number may be 0 or null (NULL).

After the backup operation is complete, it is marked that a storage location indicated by a strip key parameter carried in the strip write request already stores data. Before a next snapshot is taken, if the OSD receives a COW write request for a location of the offset of this to-be-written strip again, data may not be migrated any more, and a received strip is written, in an overwriting manner, into a storage location that is in an object whose version number is 0 and that is occupied by the offset of the to-be-written strip. In other words, the to-be-written strip is written into a storage location determined by using the object ID of the to-be-written strip, the base version number, and the offset of the to-be-written strip.

In addition, in this step, it may be further marked that the storage location into which the to-be-written strip is written already stores valid data, and for a specific marking method, reference may be made to Manner 1.

Manner 4: The write mode is COW, and the granularity of the backup mark of the data in the OSD is an object.

A difference between Manner 4 and Manner 3 is: the granularity of the backup mark of the data is changed from a strip into an object, and a backup granularity is also changed from a strip into an object.

A storage location may be determined by using an object key parameter in the strip write request. The OSD performs a query in a writing record of the OSD by using the object key parameter, and determines whether valid data is stored in the storage location indicated by the object key parameter of the to-be-written strip. Similar to the description in Manner 1, a flag bit may be used to mark an object in this embodiment. For example, a flag bit 1 indicates that valid data is stored, and if a flag bit is 0 or no flag bit of the object key parameter is found in the writing record of the OSD, it indicates that no valid data is stored.

In a general case, before a next snapshot is taken, and after only the first strip write request is received, object data needs to be backed up. Specifically, if valid data is stored, it means that an object jointly determined by using the object ID of the to-be-written strip and the version number of the to-be-written strip is already backed up after the snapshot is created, and backup does not need to be performed again; if no valid data is stored or no record of the object key parameter in the strip write request is found in the OSD, it means that backup needs to be first performed in this step, and then the to-be-written strip in the strip write request received this time can be written.

If valid data is already stored in the storage location indicated by the object key parameter, the to-be-written strip is directly written into a location jointly determined by using the object ID of the to-be-written strip, a version number 0, and the offset of the to-be-written strip.

If no valid data is stored in the storage location indicated by the object key parameter, all strips in an object of version 0 are first backed up to the storage location indicated by the object key parameter in the strip write request. After the backup is complete, the storage location indicated by the object key paramete in the strip write request is marked as 1, and then the to-be-written strip is written into a storage location that is previously occupied by the object of version 0, where a writing location is determined by using the object ID of the to-be-written strip, the version number of the to-be-written strip, and a base version number.

After step 26 is executed, the OSD sends, to the client server, a response message indicating that the to-be-written strip is successfully stored.

It should be noted that step 26 is executed before a next snapshot is taken. That is, steps 21 to 26 are executed after the first snapshot is taken and before a next snapshot is taken. Steps 21 to 26 are a procedure of writing the to-be-written strip into the OSD. The following describes how to read the strip that is already written into the OSD, and a read process and a write process are two relatively independent methods.

Step 27: The client server receives a file read request, where the file read request carries a file name, a size of to-be-read data, and an offset of the to-be-read data.

Similar to the file write request, the file read request may further carry a file path of the file read request, where the file path records a storage location of a mapping relationship table. A file may be uniquely determined by using the file path and the file name.

Specifically, this step may be executed by a program in the file system of the client server. The file read request is a read request that can be identified by the file system. The file read request requests to read a complete file or a part of data of a file.

The offset of the to-be-read data describes a relative location of the to-be-read data in the file. Specifically, the offset of the to-be-read data may describe a distance between a start location of the to-be-read data and a file header. If the offset of the to-be-read data is 0, it indicates that the start location of the to-be-read data is a start location of a to-be-read file. If the offset of the to-be-read data is 2 KB, it indicates that a distance between the start location of the to-be-read data and the start location of the file is a data size of 2 KB.

Optionally, the file read request may further carry a file path, where the file path records a storage location of a mapping relationship table. For details of the mapping relationship table, refer to the description of step 21.

The file name may be a file name of a file in which the to-be-read data is located, or may be a file name of a snapshot of a file in which the to-be-read data is located. If the file name is the file name of the file in which the to-be-read data is located, it indicates that the file read request is intended to access newest to-be-read data; if the file name is the file name of the snapshot of the file in which the to-be-read data is located, it indicates that the file read request is intended to access to-be-read data of a snapshot.

Step 28: The client server performs a query on a mapping relationship table by using the file name, to obtain an FID of a file in which the to-be-read data is located, and performs a query on file metadata according to the FID to obtain a file version number.

If the file name is the file name of the file in which the to-be-read data is located, the file path that in the mapping relationship table is a file path of the file in which the to-be-read data is located, and the file version number is acquired by performing a query on the metadata according to the FID corresponding to the file.

If the file name is the file name of the snapshot, the file path in the mapping relationship table is a path in which a snapshot file is located, and the file version number is acquired by performing a query on the metadata according to an FID of the snapshot file.

The mapping relationship table records a mapping relationship between the file name and the FID, and the file name is in a one-to-one correspondence with the FID. For descriptions of the FID and a relationship between the FID and the file version number, refer to step 21 and step 22. The storage location of the mapping relationship table may be carried in the file read request and is obtained by the client server from the read request, or the mapping relationship table may be prestored in the client server by the client server, and the client server finds the mapping relationship table according to the file path, or the mapping relationship table may be stored in another storage device.

Referring to step 22, according to different specific cases, the metadata may be stored in the inode of the file or may be stored in the root inode of the file system.

There is a one-to-one correspondence between a snapshot ID and the file version number, so that the client server can obtain the file version number according to the snapshot ID. This correspondence may be stored in the file metadata.

Step 29: The client server processes the file read request and converts the file read request into multiple read requests that include a strip read request, where each strip read request is used to request to read a strip, and the strip read request is used to request to read a to-be-read strip from the OSD; and determines an object ID corresponding to each read request, where the strip read request carries a version number of the to-be-read strip, an offset of the to-be-read strip, a size of the to-be-read strip, and an object ID of the to-be-read strip.

Specifically, an offset of each strip that needs to be read, including the to-be-read strip, may be learned according to the size of the to-be-read data and the offset of the to-be-read data.

Referring to a method for generating a strip in step 23, the to-be-written data may be split into a strip according to a strip size and by using the offset of the to-be-read data and a size of the to-be-written data, to obtain the offset of the to-be-read strip. According to the same method, in this step, the offset of each strip that needs to be read may also be obtained by using a strip size, the offset of the to-be-read data, and a length of the to-be-read data. The strip size may come from the inode of the file, and in this case, different files may use different strip sizes, or all files in an entire system share one strip size.

After the offset of the to-be-read strip is obtained, an ID of an object in which the to-be-read strip is located may be obtained according to a method that is the same as that in step 23. It should be noted that, regardless of whether the file name is the file name of the file in which the to-be-read data is located or the file name of the snapshot, an FID used for querying the object ID corresponding to the read request is the FID of the file in which the to-be-read data is located.

Step 30: The client server selects an OSD used to receive the strip read request.

Specifically, this step may be executed by the object storage client of the client server.

A strip read request and a strip write request of a same strip need to be corresponding to a same OSD. A feasible method is: using an OSD selection calculation method that is the same as that in step 24.

Step 31: The client server sends the strip read request to the OSD selected in step 30.

The version number of the to-be-read strip is actually a version number of a file to which the to-be-read strip belongs.

Optionally, a write mode may be further sent to the OSD, where the write mode is consistent with the write mode carried in the strip write request in step 25. The object ID of the to-be-read strip is the ID of the object to which the to-be-read strip belongs.

Step 32: The OSD receives the strip read request, searches for a storage location of the to-be-read strip, and sends the to-be-read strip to the client server.

The storage location of the to-be-read strip may be a start address of the to-be-read strip, and starting from the start address, data of one strip size is read, and the read data is the to-be-read strip.

In step 26, the strip is written in multiple possible manners. Therefore, the OSD may read the to-be-read strip in corresponding manners, which are also separately described in the following. In a method for determining whether a strip/an object is backed up, the flag bit described in step 26 may be used. For example, if the flag bit is 1, it indicates that the strip/the object is backed up, and if the flag bit is 0, it indicates that the strip/the object is not backed up.

For COW, there may be a special case. If the version number carried in the strip read request is a base version number, a manner for reading the to-be-read strip in the special case is different from another case, which is equivalent to specifying the base version number as the largest version number (even if a value of the base version number is 0). Therefore, for example, in a case in which the version number described in step 26 is 0, because the version number is already the largest version number, it may not be required to determine whether a strip determined by using a key parameter of the to-be-read strip is backed up, data in this storage location is directly read and used as the to-be-read strip, and the to-be-read strip is sent to the client server. In other cases, the to-be-read strip may be read in the following two manners. Except this special case, the other cases may be divided into the following two manners.

Manner 1: A granularity of a backup mark of data in the OSD is a strip.

It is determined whether a strip determined by using a strip key parameter carried in the to-be-read strip is backed up. In other words, it is determined whether a strip in a storage location determined by using the object ID of the to-be-read strip, the to-be-read strip, and the offset of the to-be-read strip is backed up. In this step, the offset of the to-be-read strip may be converted into an identifier of the to-be-read strip in the object to which the to-be-read strip belongs. For a conversion method, refer to Manner 1 in step 26.

If the strip is backed up, the strip determined by using the object ID of the to-be-read strip, the to-be-read strip, and the offset of the to-be-read strip is read and used as the to-be-read strip, and the to-be-read strip is sent to the client server.

If the strip is not backed up, it is determined whether, in an object set of the object ID of the to-be-read strip, there is valid data in strip data in a previous snapshot object until valid strip data is found.

Specifically, objects that belong to the object set of the object ID of the to-be-read strip and whose snapshot times are earlier than a snapshot time of the to-be-read strip are searched one by one by using the offset of the to-be-read strip and according to a descending order of the snapshot times of the objects until a strip that is marked as backed up is found, the found strip is used as the to-be-read strip, and the to-be-read strip is sent to the client server, where the snapshot time of the object refers to a time of the latest snapshot that is taken before this object is generated and that is of a file or a file system that includes this file.

If a later snapshot time indicates a larger snapshot version number, searching is performed according to the descending order of the snapshot times of the objects. Specifically, for ROW, searching is performed according to a descending order of version numbers; for COW, searching is performed according to an ascending order of version numbers.

Certainly, if a larger version number of the to-be-read strip is used for a later snapshot time when the strip is written into the OSD, the to-be-read strip is searched for in a reverse order in this step.

Manner 2: A granularity of a backup mark of data in the OSD is an object.

A difference between this step and the manner 1 lies in that the granularity of the backup mark is changed from a strip into an object.

It is determined whether valid data is stored in a storage location determined by using a strip key parameter carried in the to-be-read strip. In other words, it is determined whether valid data is stored in a storage location (object space) determined by using the object ID of the to-be-read strip and the version number of the to-be-read strip.

If there is valid data, valid data determined by using the object ID of the to-be-read strip, the version number of the to-be-read strip, and the offset of the to-be-read strip is read and used as the to-be-read data, and the to-be-read data is sent to the client server.

If no valid data is stored, objects in the object set are successively searched in a manner similar to Manner 1 in this step and according to an ascending order of snapshot version numbers until a snapshot object that stores valid data is found, and the to-be-read strip is read from the snapshot object according to the offset of the to-be-read strip and is sent to the client server.

Figure 4:
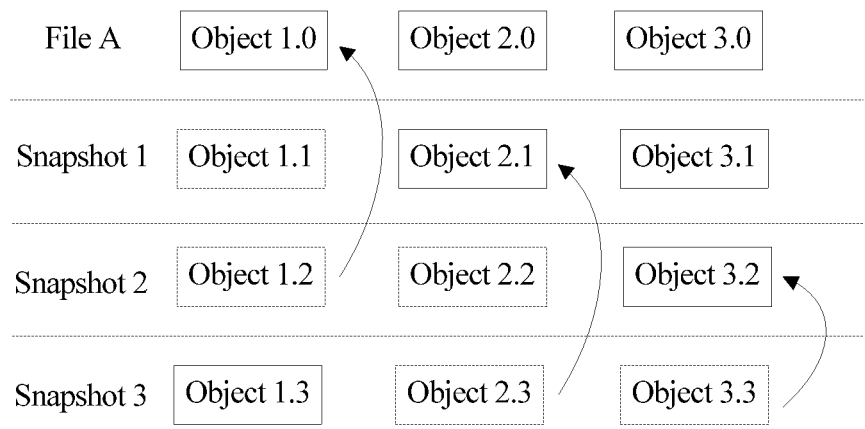
FIG. 4 is a diagram of an embodiment of a ROW-based strip read solution.

FIG. 4 shows a ROW-based strip read solution. As shown in the figure, a file A includes an object 1, an object 2, and an object 3. After these objects are stored in an OSD for the first time, version numbers of these objects are 0. In FIG. 4, an object 1.0 indicates an object whose object ID is 1 and version number is 0. Similarly, an object 3.2 indicates an object whose object ID is 3 and version number is 2. An object with a solid line indicates that this object is backed up, and an object with a dashed line indicates that this object is not backed up.

In this embodiment, after the first snapshot (whose version number is 1) is taken, data of the object 1 is not updated, the object 2 and the object 3 are backed up, and the object 1 is not backed up. After the second snapshot (whose version number is 2) is taken, the object 3 is backed up, and the object 1 and the object 2 are not backed up. After the third snapshot (whose version number is 3) is taken, the object 1 is backed up, and the object 2 and the object 3 are not backed up.

It may be learned from a concept of an object set that, an object set in which the object 1.0 is located includes the object 1.0 and an object 1.3. An object set in which the object 2.0 is located includes an object 2.0 and an object 2.1. An object set in which an object 3.0 is located includes the object 3.0, an object 3.1, and an object 3.2.

A direction of arrows in FIG. 4 marks a searching relationship of objects. If a strip read request is intended to read a strip in an object 1.2, it can be learned from the figure that this object is not backed up, and according to a descending order of version numbers, the object 1.0 is backed up, and therefore, a strip in the object 1.0 is read. Based on a same principle, if the strip read request is intended to read a to-be-read strip in an object 2.2 or an object 2.3, data in the object 2.1 is actually read. Certainly, if the strip read request is intended to read data in the object 1.3 or the object 2.1 or the object 3.2, because these objects are backed up, the data can be directly read.

Figure 5:
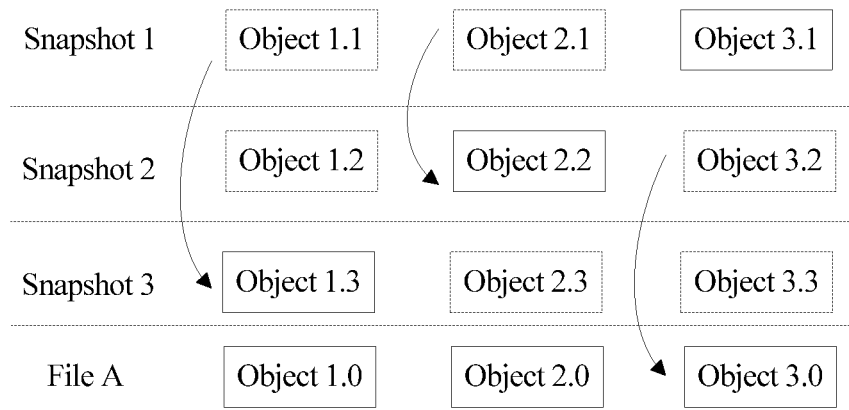
FIG. 5 is a diagram of an embodiment of a COW-based strip read solution.

FIG. 5 shows a COW-based strip read solution, and what is different from FIG. 4 is that a searching order is reverse, and searching is performed according to an ascending order of version numbers.

If a granularity of a backup mark is a strip, a principle of this solution is similar to those in FIG. 4 and FIG. 5, and a difference lies in that a target marked by the backup mark is a strip in an object, but not an object.

In the foregoing Manner 1 or Manner 2, a client server receives data returned by a strip read request and data returned by another read request, and may generate to-be-read data by splicing the returned data.

Figure 6:
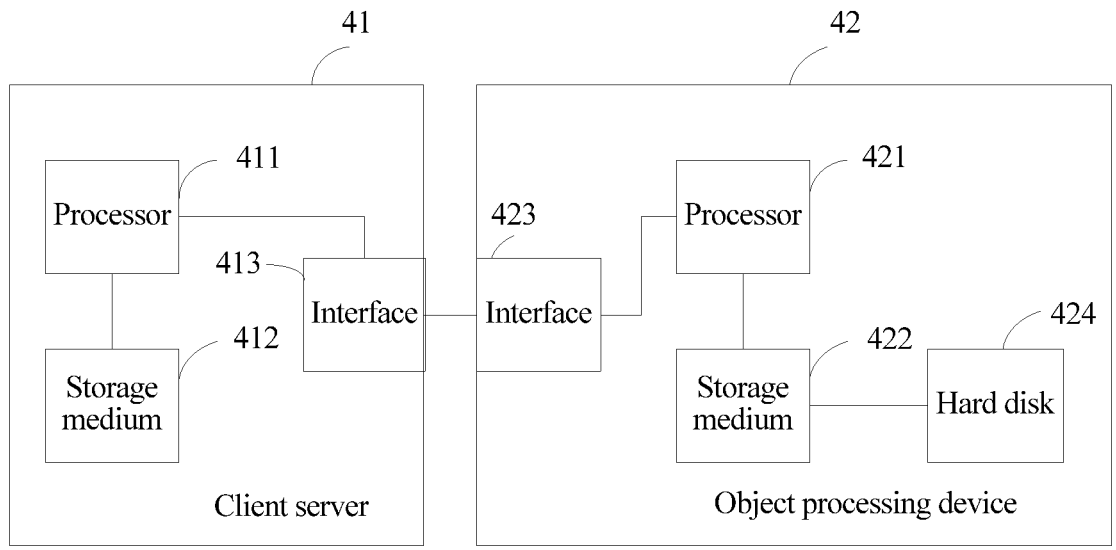
FIG. 6 is a schematic structural diagram of an embodiment of a storage system according to the present invention.

As shown in FIG. 6, FIG. 6 shows hardware for executing the foregoing method. An interface 413 of a client server 41 is connected to an interface 423 of an object storage device 42, where the client server 41 includes a processor 411, a storage medium 412, and the interface 413, and the processor 411 is connected to the storage medium 412 and the interface 413. The storage medium 412 is, for example, a memory, and stores a computer program. The processor 411 runs the program in the storage medium 412 to execute steps executed by the client server in the foregoing method. The interface 413 provides an interface connected to the OSD, for example, sends a strip read request or a strip write request to the OSD. A persistent memory may not be disposed in the client server 41, that is, all information that is related to the foregoing method and needs to be recorded in the client server 41 may be recorded in the volatile storage medium 412 of the client server 41.

The OSD 42 includes a processor 421, a storage medium 422, the interface 423, and a hard disk 424, where the processor 421 is connected to the storage medium 422 and the interface 423, and the hard disk 424 is connected to the storage medium 422. The storage medium 422 may be a volatile medium, for example, a memory, where the storage medium 422 stores a computer program. The processor 421 runs the program in the storage medium 422 to execute steps executed by the object storage device in the foregoing method. The interface 423 provides an interface connected to the OSD. For example, the interface 423 sends a strip read request or a strip write request to the OSD. The hard disk 424 provides persistent storage for a strip. For example, a non-volatile storage medium generally provides physical storage space for a to-be-written strip/object, and stores a to-be-read strip/object. The hard disk 424 may be replaced with another medium such as a flash memory, or an erasable compact disc.

Figure 7:
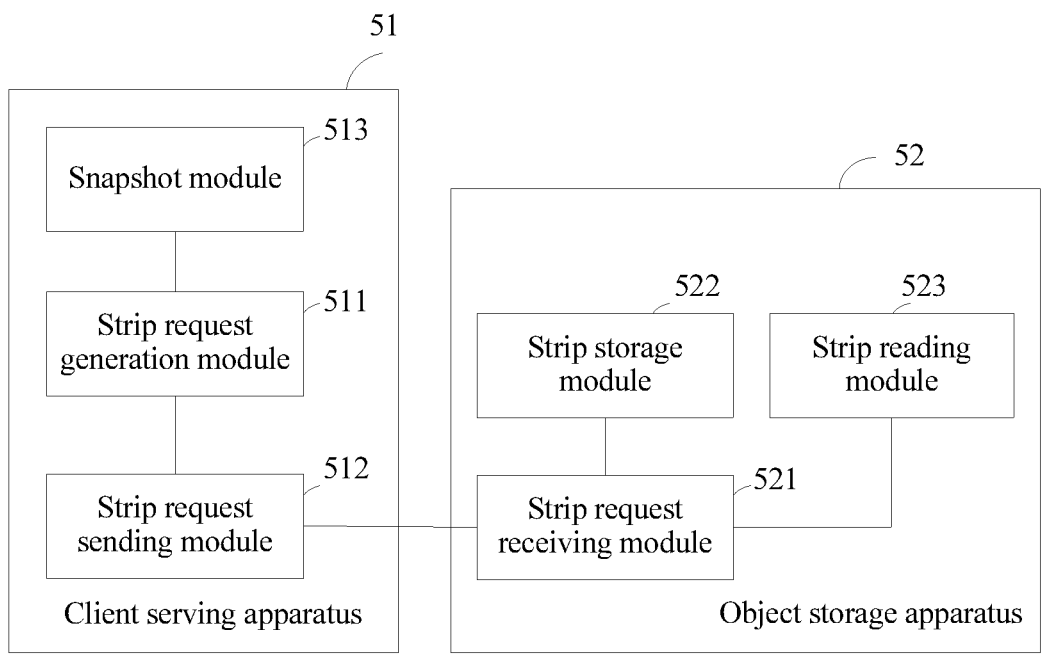
FIG. 7 is a schematic compositional diagram of an embodiment of a storage system according to the present invention.

Referring to FIG. 7, FIG. 7 is a structural diagram of a data processing system according to an embodiment of the present invention.

The data processing system includes a client serving apparatus 51 and an object storage apparatus 52. The client serving apparatus 51 may be a physical device such as a server, or may be a virtual module implemented by software that runs on a server; the object storage apparatus 52 may be a physical device such as an object storage device, or may be a virtual module implemented by software that runs on an object storage device. The client serving apparatus 51 may be configured to execute steps executed by the client server in the foregoing method, and the object storage apparatus 52 may be configured to execute steps executed by the object storage device in the foregoing method.

The client serving apparatus 51 includes a strip request generation module 511 and a strip request sending module 512 connected to the strip request generation module 511, or may further include a snapshot module 513 connected to the strip request generation module 511.

The object storage apparatus 52 includes a strip request receiving module 521, and a strip storage module 522 and a strip reading module 523 that are connected to the strip request receiving module 521. When a strip storage function is being implemented, the strip reading module is not mandatory. When a strip read function is being implemented, the strip storage module is not mandatory. The strip request receiving module 521 is connected to the strip request sending module 512.

The following continues to specifically describe functions of the modules.

The snapshot module 513 is configured to: create a snapshot, where a target of the snapshot includes a file; and allocate a snapshot ID to the snapshot.

The snapshot is created in two manners. In one manner, a snapshot of the file is created, and the target of the snapshot is a single file. In the other manner, a snapshot of a file system is created, and the target of the snapshot is an entire file system, where the file system includes multiple files. In the two manners, storage locations of file metadata are different.

In the manner of creating the snapshot of the file, the file is selected to create the snapshot, a snapshot name is set for the file, and if the snapshot name has not been used, the snapshot ID is allocated to the snapshot of the file. The snapshot ID of the file is used as metadata of the file and stored in an inode (index node) of the file. It should be noted that the snapshot ID is a mark of the snapshot. For example, a time point for creating the snapshot is used as the snapshot ID, or increasing numbers are used as snapshot IDs according to an order of time points for creating snapshots.

In the manner of creating the snapshot of the file system, the file system is selected to take the snapshot, and if a snapshot name has not been used, the snapshot ID is allocated to the snapshot of the file system, and then the allocated snapshot ID is stored in a root inode of the file system. In this manner, it may be considered that a snapshot ID of each file in the file system is the same as the snapshot ID of the file system. A difference between this manner and the previous manner is that the snapshot ID of the file is stored in the root inode of the file system, but not in the inode of the file.

In addition to the snapshot ID of the file, the file metadata further includes a file identifier (FID), and the file metadata may further include information such as a file size (Size) and a writing time.

It should be noted that the snapshot module 513 is optional. This embodiment of the present invention mainly describes operations performed by the client serving apparatus and the object storage apparatus after a snapshot is created and before a next snapshot is created.

The strip request generation module 511 is configured to receive a file write request, where the file write request carries to-be-written data, an offset of the to-be-written data, and a file name, and the to-be-written data is a part of a file.

Specifically, a function of the strip request generation module 511 may be executed by a program in a file system of the client server. The file write request is a write request that can be identified by the file system. The file write request may be creating a file, or using the to-be-written data to update a file that already exists, where the to-be-written data is a part of the file or the entire file.

The file write request may further carry a size of the to-be-written data, so that the to-be-written data is subsequently split into a strip according to the offset of the to-be-written data; or may not carry a size of the to-be-written data, because the size of the to-be-written data can be obtained by measuring the to-be-written data.

The offset of the to-be-written data describes a relative location of the to-be-written data in the file. Specifically, the offset of the to-be-written data may describe a distance between a start location of the to-be-written data and a file header. If the offset of the to-be-written data is 0, it indicates that the start location of the to-be-written data is a start location of a to-be-written file. If the offset of the to-be-written data is 1 KB, it indicates that a distance between the start location of the to-be-written data and the start location of the file is a data size of 1 KB.

Optionally, the file write request may further carry a file path of the file write request, where the file path indicates storage locations of the file and a mapping relationship table. A file is jointly determined by using a file path and a file name. For example, a combination of the file path and the file name is /root/mma/a1, where /root/mma/ is the file path, a1 is the file name, and the file and the mapping relationship table are stored in the path /root/mma/.

Different files may have different file names, and file names in a same file path are not the same.

Optionally, the write request may further carry a storage location of a mapping relationship table, where the mapping relationship table records a mapping relationship between the file name and the FID.

Before a query is performed on the mapping relationship table by using the file name, a mapping relationship between the snapshot ID and a file version number may be recorded, and the following two operations may be executed.

(1) Back up currently newest file metadata, which may be specifically implemented by backing up an inode. For a snapshot of a file level, an inode of a file is backed up, and if a snapshot of a file system is created, an inode of the file system is backed up, including both an inode of a file and a root inode of the file.

(2) Update a version number in the inode. If a write mode that is set in the client server is ROW, the updated version number is stored in the backed-up inode. If a write mode that is set in the client server is COW, the updated version number is stored in an inode that is generated by means of backup, and optionally, the backed-up inode may also record the updated version number. For example, if an inode A is backed up to generate an inode B, the inode A is a backed-up inode, and the inode B is an inode that is generated by means of backup.

There is a correspondence between the file version number and the snapshot ID, and the snapshot ID is corresponding to a snapshot time; therefore, it may also be considered that there is a correspondence between the file version number and the snapshot time. The correspondence means that each file version number is corresponding to a unique snapshot ID, and a change rule of the file version number is similar to that of the snapshot ID. For example, a larger snapshot ID indicates a larger file version number, or a larger snapshot ID indicates a smaller file version number. A snapshot with a later snapshot time among multiple snapshots has a larger ID.

It should be noted that, in a data writing technology based on a block system, including a SAN, a volume is marked by using a volume ID instead of a file name, and a function of the volume ID is similar to that of the FID. In addition, in the volume, there is no concept similar to the file path. Therefore, a query is no longer required to be performed on the mapping relationship table, and a query may be directly performed on volume metadata by using a volume ID to obtain a file version number.

The strip request generation module 511 is further configured to: perform a query on a mapping relationship table by using the file name, to obtain a file identifier (FID) of the file in which the to-be-written data is located, and perform a query on file metadata according to the FID to obtain a file version number.

The mapping relationship table records a mapping relationship between the file name and the FID, and the file name is in a one-to-one correspondence with the FID. The storage location of the mapping relationship table may be carried in the file write request and is obtained by the client server from the write request, or the mapping relationship table may be prestored in the client server by the client server, and the client server finds the mapping relationship table according to the file path, or the mapping relationship table may be stored in another storage device.

The strip request generation module 511 may further update the obtained file version number to the metadata. After the update, the file metadata records the FID and the file version number, and the file version number may be obtained by performing a query on the file metadata by using the FID. The file metadata may be stored in information about an inode. The file path indicates a storage location of the inode. It can be learned from the foregoing that, in ROW, because the version number is stored in the backed-up inode, the strip request generation module 511 reads the backed-up inode; in COW, because the version number is stored in the inode that is generated by means of backup, the strip request generation module 511 reads the inode that is generated by means of backup.

There is a one-to-one correspondence between the file version number and the snapshot ID of the file, and after generating the snapshot ID, the client server generates the file version number that is in a one-to-one correspondence with the snapshot ID. For example, the snapshot ID may be directly used as the file version number, or a snapshot ID obtained after an operation is performed may be used as the file version number. If a snapshot that is created later has a larger snapshot ID, an optional manner is: the snapshot that is created later has a larger value of the snapshot ID; another optional manner is: the snapshot that is created later has a smaller value of the snapshot ID.

The strip request generation module 511 is further configured to: split the to-be-written data into multiple strips that include a to-be-written strip (strip), and obtain, according to a strip distribution policy, an offset of the to-be-written strip and an ID of an object to which the to-be-written strip belongs, where this ID is also referred to as an object ID.

The client server splits the data into one or more strips according to a strip size (Size). A strip is data of a particular size. When the size of the to-be-written data is less than or equal to a size of a single strip, the to-be-written data is split into one strip; if the size of the to-be-written data is greater than the size of the single strip, the to-be-written data is split into multiple strips. Sizes of strips split from a same file are the same. The strip size (Size) may be stored in the file metadata, and in this case, different files may use different strip sizes. Alternatively, the strip size may not be stored in the metadata of the file to which the object belongs, files in the entire file system share one strip size, and in this case, different files use a same strip size, and the strip size is stored in the root inode of the file system. An object may be considered as a container, which can accommodate a strip.

For example, if the to-be-written data is split into several data strips, the strip generated by means of splitting refers to a data strip obtained by means of splitting; or after the to-be-written data is split into a data strip, if several verification strips are further generated to perform data protection on the data strip, the strip generated by means of splitting includes both the data strip and the verification strip.

A total quantity of strips included in each object may be stored in the file metadata, and in this case, a total quantity of strips included in objects in different files may be different; or a total quantity of strips included in each object may not be stored in the metadata of the file to which the object belongs, and in this case, a total quantity of strips included in objects in different files is the same.

It should be noted that a start location of the to-be-written data in the file may be learned from the offset of the to-be-written data, and an end location of the to-be-written data in the file may be learned from the offset of the to-be-written data and the size of the to-be-written data. If the start location of the to-be-written data is not an integer multiple of the strip size, or a value of an offset of the end location plus 1 is not an integer multiple of the strip size, the to-be-written data is first split according to the strip size, and splitting boundaries are integer multiples of the strip size. If data whose size is less than one strip (this type of data may also be referred to as dirty data of a strip) is generated after splitting, the data is supplemented to form a strip. Because of a supplementing operation performed by the strip request generation module 511, unless otherwise specified, both a strip and an offset of the strip that are subsequently mentioned refer to a strip and an offset of the strip that are obtained after supplementing.

For example, if an offset range of the to-be-written data is 4 KB-300 KB, and the strip size is 256 KB, 0 KB and 256 KB are used as boundaries for splitting the to-be-written data, and two data blocks are formed, where offset ranges of the two data blocks in the to-be-written data are respectively 4 KB-255 KB and 256 KB-300 KB. Supplementing is performed on the two data blocks, and two strips whose sizes are 256 KB are formed. Data (whose size is 4 KB–0 KB=4 KB) used to supplement a former data block comes from a previous strip, and data (whose size is 511 KB–300 KB=211 KB) used to supplement a latter data block comes from a next strip. The offset of the to-be-written data is a relative location of the to-be-written data in the file.

Another supplementing method is as follows: If the start location of the to-be-written data is not an integer multiple of the strip size, or a value of an end location offset plus 1 is not an integer multiple of the strip size, a supplementing operation may be performed on the to-be-written data of strip, so that sizes of strips obtained after splitting are consistent and there is no margin in the strip. Data that is already stored in the OSD may be read and used as data for supplementing.

For example, if an offset range of the to-be-written data is 4 KB-300 KB, and the strip size is 256 KB, the to-be-written data may be supplemented to form data whose offset range is 0 KB-511 KB, and then the data is split into two strips whose offset ranges are 0 KB-255 KB and 256 KB-511 KB, so that a size of each strip is 256 KB.

The strip distribution policy is provided by the file system of the client server. The object to which the strip belongs is described, that is, a correspondence between the strip and the object is described. Specifically, the correspondence may be a correspondence between the offset of the strip and the object.

An object ID uniquely identifies an object, IDs of objects that belong to a same file are different, and IDs of objects in different files are also different.

Optionally, there may be a correspondence between the object ID and the FID of the file to which the object belongs. That is, for example, a file from which an object represented by this object ID comes may be learned from the object ID.

For example, an optional manner for generating the object ID is as follows: The object ID includes binary numbers of 64 bits, where former 32 bits are an ID of the file to which the object belongs, latter 32 bits are assigned by the client server, the latter 32 bits are unique in the file, and latter 32 bits of different objects in a same file are different. For example, an identifier of an object in a file is used. In this manner, the corresponding FID may be learned from the former 32 bits of the object ID. Similarly, in the block (block) system, a relationship between an object ID and a volume ID may also be established.

Another optional manner for generating the object ID is as follows: The object ID includes binary numbers of 48 bits, where former 16 bits are corresponding to the file, and former 16 bits of different files are different; latter 32 bits are assigned by the client server, the latter 32 bits are unique in the file, and latter 32 bits of different objects in a same file are different.

In another embodiment, there may also be no correspondence between the ID and the FID of the file to which the object belongs.

FIG. 3A and FIG. 3B show two different strip distribution policies. A strip index describes an offset relationship of a strip in a file, and the strip index is an integer greater than or equal to 0, where the smallest strip index is 0, the second smallest strip index is 1, and the third smallest strip index is 2, . . . , and so on. Two strips with adjacent index values also have adjacent offsets in the file.

An optional strip distribution policy is shown in FIG. 3A: (1) sizes of objects that belong to a same file are fixed, and sizes of strips in a same file are the same, which means that a total quantity of strips included in different objects is the same; (2) a previous object is first filled and then a next object is filled by strips according to an index order, that is, several consecutive strips belong to a same object according to an order of offset sizes of strips in the to-be-written data. As shown in FIG. 3A, each object fixedly includes four strips. For example, a strip size is 256 KB, and each object has four strips, that is, an object size is 256 KB×4=1024 KB. In this case, the first object stores the strip 0 to strip 3, the second object stores the strip 4 to the strip 7, and the third object stores the strip 8 to strip 11, . . . and accordingly, an ID of the first object is 0, an ID of the second object is 1, and an ID of the third object is 2, . . . .

A strip offset is used to describe a relative location of a strip in an object, and may be specifically a relative location of start data of the strip in the object. Strip offset=(Strip index % Quantity of strips in an object)×Strip size, where Strip index % Quantity of strips in an object refers to calculating a remainder by dividing the strip index by the quantity of strips in the object.

Another optional strip distribution policy is shown in FIG. 3B: (1) sizes of objects in a same file are not fixed, that is, different objects in the same file may have different total quantities of strips; (2) a total quantity of objects is fixed, that is, different files have objects of a same quantity, and as shown in FIG. 3B, there are three objects in total. For example, if a strip size is 256 KB, and a total quantity of objects is fixed to 3, the first strip (strip 0) is located in the first object (object 0), the second strip (strip 1) is located in the second object (object 1), . . . , and by analogy, the fourth strip (strip 3) is also located in the first object, and the fifth strip (strip 4) is also located in the second object. A strip index is an integer greater than or equal to 0, and describes a location relationship between strips in a file. An offset of each strip in an object to which the strip belongs may also be determined, and an identifier of an object in the file may be rip index is divided by a total quantity of objects in the file. A specific calculation formula may be: Identifier of an object in a file=Strip index % Quantity of objects in a file, and Strip offset=(Strip index/Quantity of objects)×Strip size.

The strip index may be determined by using the offset of the to-be-written data. For example, for an entire file, start data obtained after the file is split is located in a strip (strip 0) in the first object, and the offset of the current to-be-written data is located in the fifth strip (strip 4) in the object 1. In this case, in strips generated after the to-be-written data is split, an index of the first strip is 4, and an index of another strip is obtained by analogy.

The foregoing describes two solutions for calculating the ID of the object to which the strip belongs, and according to different strip distribution policies, there may also be another implementation solution. Parameters used in different distribution policies may be different, and these parameters may be generally obtained by performing a query on the client server.

Because processing manners of all strips are the same, the following uses only a "to-be-written strip" as an example for description.

The strip request sending module 512 is configured to select an OSD used to store the to-be-written strip.

An optional calculation method is determining, according to the FID of the to-be-written strip, the OSD for storing the to-be-written strip. For example, a hash value of the FID is divided by a total quantity of OSDs, and a remainder is used as an identifier of the OSD for storing the to-be-written strip, that is, the hash value of the FID mod the total quantity of OSDs. There may also be another solution. For example, the client server randomly selects an OSD to store a to-be-written strip that belongs to an object, and strips that belong to a same object may be stored in a same OSD.

In addition, the OSD for storing the strip may also be jointly determined according to the FID and an object ID that are of the to-be-written strip. Actually, a calculation method may be randomly selected provided that an OSD can be selected.

The strip request sending module 512 is further configured to send a strip write request to the OSD, where the strip write request carries the to-be-written strip, a version number of the to-be-written strip, a size of the to-be-written strip, the offset of the to-be-written strip, and the ID of the object to which the to-be-written strip belongs.

Optionally, in a case in which the OSD supports both ROW and COW, a write mode may be further sent, so that the OSD writes the to-be-written strip according to the write mode specified by the client server. The write mode is ROW or COW. If the OSD supports only one write mode, the write mode may not be sent to the OSD.

The strip request receiving module 521 is configured to receive the strip write request and write the to-be-written strip into a storage medium of the OSD.

The strip request receiving module 521 may execute the method in step 26. For example, writing of the to-be-written strip may be implemented in one or more of four manners.

The strip request generation module 511 may be further configured to receive a file read request, where the file read request carries a file name, a size of to-be-read data, and an offset of the to-be-read data.

Similar to the file write request, the file read request may further carry a file path of the file read request, where the file path records a storage location of a mapping relationship table. A file may be uniquely determined by using the file path and the file name.

Specifically, this step may be executed by a program in the file system of the client server. The file read request is a read request that can be identified by the file system. The file read request requests to read a complete file or a part of data of a file.

The offset of the to-be-read data describes a relative location of the to-be-read data in the file. Specifically, the offset of the to-be-read data may describe a distance between a start location of the to-be-read data and a file header. If the offset of the to-be-read data is 0, it indicates that the start location of the to-be-read data is a start location of a to-be-read file. If the offset of the to-be-read data is 2 KB, it indicates that a distance between the start location of the to-be-read data and the start location of the file is a data size of 2 KB.

Optionally, the file read request may further carry a file path, where the file path records a storage location of a mapping relationship table. For details of the mapping relationship table, refer to the description of step 21.

The file name may be a file name of a file in which the to-be-read data is located, or may be a file name of a snapshot of a file in which the to-be-read data is located. If the file name is the file name of the file in which the to-be-read data is located, it indicates that the file read request is intended to access newest to-be-read data; if the file name is the file name of the snapshot of the file in which the to-be-read data is located, it indicates that the file read request is intended to access to-be-read data of a snapshot. The strip storage module 522 is configured to: perform a query on a mapping relationship table by using the file name, to obtain an FID of a file in which the to-be-read data is located, and perform a query on file metadata according to the FID to obtain a file version number.

If the file name is the file name of the file in which the to-be-read data is located, the file path that stores the mapping relationship table is a file path of the file in which the to-be-read data is located, and the file version number is acquired by performing a query on the metadata according to the FID corresponding to the file.

If the file name is the file name of the snapshot, the file path in the mapping relationship table is a path in which a snapshot file is located, and the file version number is acquired by performing a query on the metadata according to an FID of the snapshot file.

The mapping relationship table records a mapping relationship between the file name and the FID, and the file name is in a one-to-one correspondence with the FID. For descriptions of the FID and a relationship between the FID and the file version number, refer to step 21 and step 22. The storage location of the mapping relationship table may be carried in the file read request and is obtained by the client server from the write request, or the mapping relationship table may be prestored in the client server by the client server, and the client server finds the mapping relationship table according to the file path, or the mapping relationship table may be stored in another storage device.

Referring to step 22, according to different specific cases, the metadata may be stored in the inode of the file or may be stored in the root inode of the file system.

There is a one-to-one correspondence between a snapshot ID and the file version number, so that the client server can obtain the file version number according to the snapshot ID. This correspondence may be stored in the file metadata.

The strip request generation module 511 may be further configured to: process the file read request and convert the file read request into multiple read requests that include a strip read request, where each strip read request is used to request to read a strip, and the strip read request is used to request to read a to-be-read strip from the OSD; and determine an object ID corresponding to each read request, where the strip read request carries a version number of the to-be-read strip, an offset of the to-be-read strip, a size of the to-be-read strip, and an object ID of the to-be-read strip.

Specifically, an offset of each strip that needs to be read, including the to-be-read strip, may be learned according to the size of the to-be-read data and the offset of the to-be-read data.

Referring to a method for generating a strip in step 23, the to-be-written data may be split into a strip according to a strip size and by using the offset of the to-be-written data and a length of the to-be-written data, to obtain the offset of the to-be-read strip. According to the same method, in this step, the offset of each strip that needs to be read may also be obtained by using a strip size, the offset of the to-be-read data, and a length of the to-be-read data. The strip size may come from the inode of the file, and in this case, different files may use different strip sizes, or all files in an entire system share one strip size.

After the offset of the to-be-read strip is obtained, an ID of an object in which the to-be-read strip is located may be obtained according to a method that is the same as that in step 23. It should be noted that, regardless of whether the file name is the file name of the file in which the to-be-read data is located or the file name of the snapshot, an FID used for querying the object ID corresponding to the read request is the FID of the file in which the to-be-read data is located.

The strip request sending module 512 may be further configured to select an OSD used to receive the strip read request.

Specifically, this step may be executed by the object storage client of the client server.

A strip read request and a strip write request of a same strip need to be corresponding to a same OSD. A feasible method is: using an OSD selection calculation method that is the same as that in step 24.

The strip request sending module 512 may be further configured to send the strip read request to the selected OSD.

The version number of the to-be-read strip is a version number of a file to which the to-be-read strip belongs.

Optionally, a write mode may be further sent to the OSD, where the write mode is consistent with the write mode carried in the strip write request in step 25. The object ID of the to-be-read strip is the ID of the object to which the to-be-read strip belongs.

The strip request receiving module 521 may be further configured to: receive the strip read request, search for a storage location of the to-be-read strip, and send the to-be-read strip to the client serving apparatus.

The strip request receiving module 521 may implement a function in step 32, for example, reads the to-be-read strip in Manner 1 or Manner 2 mentioned in step 32. Therefore, for a specific function of the strip request receiving module 521, reference may be made to step 32.

Each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

What is claimed is:

1. A data processing method, wherein the method comprises:
    receiving, by an object storage device (OSD), a strip write request sent by a client server, wherein the strip write request carries a to-be-written strip, a version number of the to-be-written strip, an offset of the to-be-written strip, and an object ID of the to-be-written strip, the version number of the to-be-written strip is corresponding to a snapshot ID of a latest snapshot of a file or a volume to which the to-be-written strip belongs, the offset of the to-be-written strip describes a location of the to-be-written strip in an object to which the to-be-written strip belongs, and the object ID of the to-be-written strip is an ID of the object to which the to-be-written strip belongs;
    determining, by the OSD, whether a strip determined by using the version number of the to-be-written strip, the object ID of the to-be-written strip, and the offset of the to-be-written strip is backed up; and
    if the strip is backed up, writing the to-be-written strip into a storage location determined by using the version number of the to-be-written strip, the object ID of the to-be-written strip, and the offset of the to-be-written strip; or
    if the strip is not backed up, backing up data that is in an object of a base version in the OSD and whose offset is the offset of the to-be-written strip and size is a size of the to-be-written strip to the storage location determined by using the version number of the to-be-written strip, the offset of the to-be-written strip, and the object ID of the to-be-written strip, wherein an object ID of the object of the base version is the same as the object ID of the to-be-written strip, and a version number of the object of the base version is a base version number;
    and writing the to-be-written strip into a storage location determined by using the object ID of the to-be-written strip, the base version number, and the offset of the to-be-written strip.

2. The method according to claim 1, wherein before the receiving a strip write request sent by a client server, the method further comprises:
    taking, by the client server, a snapshot of the file or the volume to which the to-be-written strip belongs, and generating the snapshot ID of the latest snapshot; and
    generating the version number of the to-be-written strip according to the snapshot ID of the latest snapshot.

3. The method according to claim 2, wherein the method further comprises:
    updating, by the client server, the version number of the to-be-written strip to metadata of the file or the volume.

4. The method according to claim 1, wherein before the receiving, by an OSD, a strip write request, the method further comprises:
    receiving, by the client server, a file write request, wherein the file write request carries to-be-written data, an offset of the to-be-written data, and a file name, and the to-be-written data is a part of the file;
    obtaining, by the client server, a file identifier FID according to the file name, performing a query on the metadata of the file according to the FID to obtain a version number of the file, and using the version number of the file as the version number of the to-be-written strip, wherein the version number of the file is corresponding to the snapshot ID of the latest snapshot of the file to which the to-be-written strip belongs;
    splitting, by the client server according to the offset of the to-be-written data and a size of the to-be-written data, the to-be-written data into multiple strips that comprise the to-be-written strip, determining the ID of the object to which the to-be-written strip belongs, and obtaining the offset of the to-be-written strip; and
    creating the strip write request.

5. The method according to claim 1, wherein before the receiving, by an OSD, a strip write request, the method further comprises:
    receiving, by the client server, a volume write request, wherein the volume write request carries to-be-written data, an offset of the to-be-written data, and a volume identifier ID, and the to-be-written data is a part of the volume;
    performing, by the client server, a query on the metadata of the volume according to the volume ID to obtain a version number of the volume, and using the version number of the volume as the version number of the to-be-written strip, wherein the version number of the volume is corresponding to the snapshot ID of the latest snapshot of the volume to which the to-be-written strip belongs;
    splitting, by the client server according to the offset of the to-be-written data and a size of the to-be-written data, the to-be-written data segment into multiple strips that comprise the to-be-written strip, determining the ID of the object to which the to-be-written strip belongs, and obtaining the offset of the to-be-written strip; and
    creating the strip write request.

6. A data processing method, wherein the method comprises:
    receiving, by an object storage device OSD, a strip write request sent by a client server, wherein the strip write request carries a to-be-written strip, a version number of the to-be-written strip, an offset of the to-be-written strip, and an object ID of the to-be-written strip, the version number of the to-be-written strip is corresponding to a snapshot ID of a latest snapshot of a file or a volume to which the to-be-written strip belongs, the offset of the to-be-written strip describes a location of the to-be-written strip in an object to which the to-be-written strip belongs, and the object ID of the to-be-written strip is an ID of the object to which the to-be-written strip belongs;

determining, by the OSD, whether an object determined by using the version number of the to-be-written strip and the object ID is backed up; and if the object is backed up, writing, by the OSD, the to-be-written strip into a storage location determined by using the object ID, a version number of the object, and the offset of the to-be-written strip; or if the object is not backed up, backing up data in an object of a base version in the OSD to a storage location determined by using the version number of the to-be-written strip and the object ID, wherein an object ID of the object of the base version is the same as the object ID of the to-be-written strip, and a version number of the object of the base version is a base version number; and writing, by the OSD, the to-be-written strip into a storage location determined by using the object ID, the base version number, and the offset of the to-be-written strip.

7. A data reading method, wherein the method comprises:

receiving, by an object storage device (OSD), a strip read request sent by a client server, wherein the strip read request carries a size of a to-be-read strip, an offset of the to-be-read strip, a version number of the to-be-read strip, and an object ID of the to-be-read strip, the version number of the to-be-read strip is corresponding to a snapshot ID of a latest snapshot of a file or a volume to which the to-be-read strip belongs, and the object ID of the to-be-read strip is an ID of an object to which the to-be-read strip belongs;

determining, by the OSD, whether a strip determined by using the object ID, the version number of the to-be-read strip, and the offset of the to-be-read strip is backed up; and if the strip is backed up, reading data determined by using the object ID, the version number of the to-be-read strip, the offset of the to-be-read strip, and the size of the to-be-read strip, using the read data as the to-be-read strip, and sending the to-be-read strip to the client server; or if the strip is not backed up, searching, one by one according to a descending order of snapshot times of objects, the objects whose object IDs are the same as the object ID of the to-be-read strip and version numbers are different from the version number of the to-be-read strip until an object that stores valid data in a storage location determined by using the offset of the to-be-read strip is found, using the found valid data as the to-be-read strip, and sending the to-be-read strip to the client server, wherein a version number of the object is corresponding to the snapshot ID that is of the latest snapshot of the file or the volume to which the to-be-read strip belongs and that exists before the object is generated.

8. The method according to claim 7, wherein the method further comprises:

if a write mode of the OSD is ROW, the descending order of the snapshot times of the objects is a descending order of version numbers; or if a write mode of the OSD is COW, the descending order of the snapshot times of the objects is an ascending order of version numbers.

9. The method according to claim 7, wherein before the receiving, by an OSD, a strip read request sent by a client server, the method further comprises:

receiving, by the client server, a file read request, wherein the file read request carries a file name, a size of to-be-read data, and an offset of the to-be-read data, and the to-be-read data is a part of the file;

obtaining, by the client server, a file identifier FID according to the file name, performing a query on metadata of the file according to the FID to obtain a version number of the file, and using the version number of the file as the version number of the to-be-read strip, wherein the version number of the file is corresponding to the snapshot ID of the latest snapshot of the file to which the to-be-read strip belongs;

determining, by the client server according to the offset of the to-be-read data and the size of the to-be-read data, the ID of the object to which the to-be-read strip belongs, and obtaining the offset of the to-be-read strip; and generating the strip read request.

10. The method according to claim 7, wherein before the receiving, by an OSD, a strip write request sent by a client server, the method further comprises:

receiving, by the client server, a volume read request, wherein the volume read request carries a volume ID, a size of to-be-read data, and an offset of the to-be-read data, and the to-be-read data is a part of the volume;

performing, by the client server, a query on metadata of the volume according to the volume ID to obtain a version number of the volume, and using the version number of the volume as the version number of the to-be-read strip, wherein the version number of the volume is corresponding to the snapshot ID of the latest snapshot of the volume to which the to-be-read strip belongs;

determining, by the client server according to the offset of the to-be-read data and the size of the to-be-read data, the ID of the object to which the to-be-read strip belongs, and obtaining the offset of the to-be-read strip; and generating the strip read request.

11. A data reading method, applied to an object storage system, wherein the object storage system comprises an object-based storage device OSD and a client server, and the method comprises:

receiving, by the OSD, a strip read request sent by the client server, wherein the strip read request carries a size of a to-be-read strip, an offset of the to-be-read strip, a version number of the to-be-read strip, and an object ID of the to-be-read strip, the version number of the to-be-read strip is corresponding to a snapshot ID of a latest snapshot of a file or a volume to which the to-be-read strip belongs, and the object ID of the to-be-read strip is an ID of an object to which the to-be-read strip belongs;

determining, by the OSD, whether an object determined by using the object ID and the version number of the to-be-read strip is backed up; and if the object is backed up, reading data determined by using the object ID, the version number of the to-be-read strip, the offset of the to-be-read strip, and the size of the to-be-read strip, using the read data as the to-be-read strip, and sending the to-be-read strip to the client server; or if the object is not backed up, searching, one by one according to a descending order of snapshot times of objects, the objects whose object IDs are the same as the object ID of the to-be-read strip and version numbers are different from the version number of the to-be-read strip until an object that stores valid data in a storage location determined by using the offset of the to-be-read strip is found, using the found valid data as the to-be-read strip, and sending the to-be-read strip to the client server, wherein a version number of the object is corresponding to the snapshot ID that is of the latest snapshot of the file or the volume to which the to-be-read strip belongs and that exists before the object is generated.

12. An object storage device, comprising a processor, and a storage medium and an interface that are connected to the processor, wherein:

the interface is configured to receive a strip write request sent by a client server, wherein the strip write request carries a to-be-written strip, a version number of the to-be-written strip, an offset of the to-be-written strip, and an object ID of the to-be-written strip, the version number of the to-be-written strip is corresponding to a snapshot ID of a latest snapshot of a file or a volume to which the to-be-written strip belongs, the offset of the to-be-written strip describes a location of the to-be-written strip in an object to which the to-be-written strip belongs, and the object ID of the to-be-written strip is an ID of the object to which the to-be-written strip belongs;

the storage medium stores a computer program; and by running the computer program, the processor is configured to:

determine whether a strip determined by using the version number of the to-be-written strip, the object ID of the to-be-written strip, and the offset of the to-be-written strip is backed up; and if the strip is backed up, writing the to-be-written strip into a storage location determined by using the version number of the to-be-written strip, the object ID of the to-be-written strip, and the offset of the to-be-written strip; or if the strip is not backed up, backing up data that is in an object of a base version in the object storage device and whose offset is the offset of the to-be-written strip and size is a size of the to-be-written strip to the storage location determined by using the version number of the to-be-written strip, the offset of the to-be-written strip, and the object ID of the to-be-written strip, wherein an object ID of the object of the base version is the same as the object ID of the to-be-written strip, and a version number of the object of the base version is a base version number; and writing the to-be-written strip into a storage location determined by using the object ID of the to-be-written strip, the base version number, and the offset of the to-be-written strip.

13. An object storage device, comprising a processor, and a storage medium and an interface that are connected to the processor, wherein:

the interface is configured to receive a strip write request sent by a client server, wherein the strip write request carries a to-be-written strip, a version number of the to-be-written strip, an offset of the to-be-written strip, and an object ID of the to-be-written strip, the version number of the to-be-written strip is corresponding to a snapshot ID of a latest snapshot of a file or a volume to which the to-be-written strip belongs, the offset of the to-be-written strip describes a location of the to-be-written strip in an object to which the to-be-written strip belongs, and the object ID of the to-be-written strip is an ID of the object to which the to-be-written strip belongs;

the storage medium stores a computer program; and the processor executes the following steps by running the computer program:

determining whether an object determined by using the version number of the to-be-written strip and the object ID is backed up; and if the object is backed up, writing, by the data storage device, the to-be-written strip into a storage location determined by using the object ID, a version number of the object, and the offset of the to-be-written strip; or if the object is not backed up, backing up, by the data storage device, data in an object of a base version to a storage location determined by using the version number of the to-be-written strip and the object ID, wherein an object ID of the object of the base version is the same as the object ID of the to-be-written strip, and a version number of the object of the base version is a base version number; and writing, by the data storage device, the to-be-written strip into a storage location determined by using the object ID, the base version number, and the offset of the to-be-written strip.

14. An object storage device, comprising a processor, and a storage medium and an interface that are connected to the processor, wherein:

the interface is configured to receive a strip read request sent by a client server, wherein the strip read request carries a size of a to-be-read strip, an offset of the to-be-read strip, a version number of the to-be-read strip, and an object ID of the to-be-read strip, the version number of the to-be-read strip is corresponding to a snapshot ID of a latest snapshot of a file or a volume to which the to-be-read strip belongs, and the object ID of the to-be-read strip is an ID of an object to which the to-be-read strip belongs;

the storage medium stores a computer program; and by running the computer program, the processor is configured to:

determine whether a strip determined by using the object ID, the version number of the to-be-read strip, and the offset of the to-be-read strip is backed up; and if the strip is backed up, reading data determined by using the object ID, the version number of the to-be-read strip, the offset of the to-be-read strip, and the size of the to-be-read strip, using the read data as the to-be-read strip, and sending the to-be-read strip to the client server; or if the strip is not backed up, searching, one by one according to a descending order of snapshot times of objects, the objects whose object IDs are the same as the object ID of the to-be-read strip and version numbers are different from the version number of the to-be-read strip until an object that stores valid data in a storage location determined by using the offset of the to-be-read strip is found, using the found valid data as the to-be-read strip, and sending the to-be-read strip to the client server, wherein a version number of the object is corresponding to the snapshot ID that is of the latest snapshot of the file or the volume to which the to-be-read strip belongs and that exists before the object is generated.

15. The object storage device according to claim 14, wherein the descending order of the snapshot times of the objects specifically comprises:
   if a write mode of the object storage device is ROW, the descending order of the snapshot times of the objects is a descending order of version numbers; or
   if a write mode of the object storage device is COW, the descending order of the snapshot times of the objects is an ascending order of version numbers.

16. An object storage device, comprising a processor, and a storage medium and an interface that are connected to the processor, wherein:
   the interface is configured to receive a strip read request sent by a client server, wherein the strip read request carries a size of a to-be-read strip, an offset of the to-be-read strip, a version number of the to-be-read strip, and an object ID of the to-be-read strip, the version number of the to-be-read strip is corresponding to a snapshot ID of a latest snapshot of a file or a volume to which the to-be-read strip belongs, and the object ID of the to-be-read strip is an ID of an object to which the to-be-read strip belongs;
   the storage medium stores a computer program; and
   the processor executes the following steps by running the computer program:
   determining whether an object determined by using the object ID and the version number of the to-be-read strip is backed up; and
   if the object is backed up, reading data determined by using the object ID, the version number of the to-be-read strip, the offset of the to-be-read strip, and the size of the to-be-read strip, using the read data as the to-be-read strip, and sending the to-be-read strip to the client server; or
   if the object is not backed up, searching, one by one according to a descending order of snapshot times of objects, the objects whose object IDs are the same as the object ID of the to-be-read strip and version numbers are different from the version number of the to-be-read strip until an object that stores valid data in a storage location determined by using the offset of the to-be-read strip is found, using the found valid data as the to-be-read strip, and sending the to-be-read strip to the client server, wherein a version number of the object is corresponding to the snapshot ID that is of the latest snapshot of the file or the volume to which the to-be-read strip belongs and that exists before the object is generated.

* * * * *

UNITED STATES PATENT AND TRADEMARK OFFICE
CERTIFICATE OF CORRECTION

PATENT NO. : 11,032,368 B2
APPLICATION NO. : 15/634819
DATED : June 8, 2021
INVENTOR(S) : Fang Page 1 of 1

It is certified that error appears in the above-identified patent and that said Letters Patent is hereby corrected as shown below:

On the Title Page

Applicant item (71): "HUAWEI TECHNOLOGIES CO., LTD., Guangdong (CN)" should read
-- HUAWEI TECHNOLOGIES CO., LTD., Shenzhen (CN) --.

Page 2, item (56) Foreign Patent Documents, Citation 8: "NO 2014188418 A1 11/2014" should read
-- WO 2014188418 A1 11/2014 --.

Signed and Sealed this
Twenty-seventh Day of June, 2023

Katherine Kelly Vidal
*Director of the United States Patent and Trademark Office*